United States Patent
Wu et al.

(10) Patent No.: US 10,217,218 B2
(45) Date of Patent: *Feb. 26, 2019

(54) LINEAR-BASED EULERIAN MOTION MODULATION

(71) Applicants: Massachusetts Institute of Technology, Cambridge, MA (US); Quanta Computer Inc., Tao Yuan Shein (TW)

(72) Inventors: Hao-yu Wu, Cambridge, MA (US); Michael Rubinstein, Somerville, MA (US); Eugene Inghaw Shih, Brookline, MA (US); John V. Guttag, Lexington, MA (US); Frederic Durand, Somerville, MA (US); William T. Freeman, Acton, MA (US); Neal Wadhwa, Mountain Veiw, CA (US)

(73) Assignees: Massachusetts Institute of Technology, Cambridge, MA (US); Quanta Computer Inc., Tao Yuan Shein (TW)

( * ) Notice: Subject to any disclaimer, the term of this patent is extended or adjusted under 35 U.S.C. 154(b) by 14 days.

This patent is subject to a terminal disclaimer.

(21) Appl. No.: 15/982,765

(22) Filed: May 17, 2018

(65) Prior Publication Data
US 2018/0268543 A1    Sep. 20, 2018

Related U.S. Application Data

(63) Continuation of application No. 15/721,375, filed on Sep. 29, 2017, now Pat. No. 10,007,986, which is a
(Continued)

(51) Int. Cl.
*G06K 9/00* (2006.01)
*G06T 7/00* (2017.01)
(Continued)

(52) U.S. Cl.
CPC .......... *G06T 7/0012* (2013.01); *G06T 7/0016* (2013.01); *G06T 7/254* (2017.01);
(Continued)

(58) Field of Classification Search
None
See application file for complete search history.

(56) References Cited

U.S. PATENT DOCUMENTS

| 4,063,281 A | 12/1977 | Kornreich |
| 7,821,546 B2 | 10/2010 | Sakamoto |

(Continued)

OTHER PUBLICATIONS

Bai, J., et al., "Selectively de-animating video," ACM Transactions on Graphics, (2012).

(Continued)

*Primary Examiner* — Sean M Conner
(74) *Attorney, Agent, or Firm* — Hamilton, Brook, Smith & Reynolds, PC

(57) ABSTRACT

In an embodiment, a method converts two images to a transform representation in a transform domain. For each spatial position, the method examines coefficients representing a neighborhood of the spatial position that is spatially the same across each of the two images. The method calculates a first vector in the transform domain based on first coefficients representing the spatial position, the first vector representing change from a first to second image of the two images describing deformation. The method modifies the first vector to create a second vector in the transform domain representing amplified movement at the spatial position between the first and second images. The method calculates second coefficients based on the second vector of the transform domain. From the second coefficients, the method generates an output image showing motion amplified according to the second vector for each spatial position between the first and second images.

19 Claims, 16 Drawing Sheets
(5 of 16 Drawing Sheet(s) Filed in Color)

Related U.S. Application Data continuation of application No. 13/850,717, filed on Mar. 26, 2013, now Pat. No. 9,811,901, which is a continuation-in-part of application No. 13/707,451, filed on Dec. 6, 2012, now Pat. No. 9,324,005, and a continuation-in-part of application No. 13/607,173, filed on Sep. 7, 2012, now Pat. No. 9,805,475.

(51) Int. Cl.
  *G06T 7/262* (2017.01)
  *G06T 7/254* (2017.01)
(52) U.S. Cl.
  CPC .... *G06T 7/262* (2017.01); *G06T 2207/20016* (2013.01); *G06T 2207/30076* (2013.01); *G06T 2207/30088* (2013.01); *G06T 2207/30104* (2013.01); *G06T 2207/30201* (2013.01)

(56) References Cited

U.S. PATENT DOCUMENTS

| | | | |
|---|---|---|---|
| 9,324,005 | B2 | 4/2016 | Wadhwa |
| 9,338,331 | B2 | 5/2016 | Wadhwa |
| 9,805,475 | B2 | 10/2017 | Rubinstein |
| 9,811,901 | B2 | 11/2017 | Wu |
| 10,007,986 | B2 | 6/2018 | Wu |
| 2007/0115370 | A1 | 5/2007 | Sakamoto |
| 2007/0185393 | A1 | 8/2007 | Zhou |
| 2008/0037906 | A1 | 2/2008 | Yano |
| 2009/0208080 | A1 | 8/2009 | Grau |
| 2009/0304246 | A1 | 12/2009 | Walker |
| 2010/0166300 | A1 | 7/2010 | Spampinato |
| 2014/0072190 | A1 | 3/2014 | Wu |
| 2014/0072228 | A1 | 3/2014 | Rubinstein |
| 2014/0072229 | A1 | 3/2014 | Wadhwa |
| 2014/0153692 | A1 | 6/2014 | Larkin |
| 2015/0124062 | A1 | 5/2015 | Didyk |
| 2015/0195430 | A1 | 7/2015 | Wadhwa |

OTHER PUBLICATIONS

Balakrishnan, Guha et al. "Detecting pulse from head motions in video," Computer Vision and Pattern Recognition (CVPR) IEEE Conference on IEEE (2013).
Bojanic, S., et al., "Ocular microtremor: a tool for measuring depth of anaesthesia?" British J. Anaestheia, 86(4): 519-522 (2001).
Burt, P. and Adelson, E., "The laplacian pyramid as a compact image code," IEEE Trans. Comm., 31(4): 532-540 (1983).
Fleet, D.J. and Jepson, A.D., "Computation of component image velocity from local phase information," Int. J. Comput., Vision 5(1): 77-104 (Sep. 1990).
Freeman, W.T., et al., "Motion without movement," SIGGRAPH Comput. Graph., 25: 27-30 (Jul. 1991).
Fuchs, M., et al., "Real-time temporal shaping of high-speed video streams," Computers & Graphics, 34(5) : 575-584 (2010).
Gautama, T. and Van Hulle, M., "A phase-based approach to the estimation of the optical flow field using spatial filtering", Neural Networks, IEEE Transactions, 13(5): 1127-1136 (Sep. 2002).
Liu, C., et al., "Motion magnification", ACM Trans. Graph., 24: 519-526 (Jul. 2005).
Lucas, B.D. and Kanade, T., "An Interative Image Registration Technique with an Application to Stereo Vision"; IJCAI, vol. 81, 1981.
Poh, Ming-Zher et al., "Non-contract, automated cardiac pulse measurements using video imaging and blind source separation," Optics Express, 18.10, pp. 10762-10774 (2010).
Portilla, J. and Simoncelli, E.D., "A parametric texture model based on joint statistics of complex wavelet coefficients," Int. J. Comput. Vision, 49(1): 49-70 (Oct. 2000).
Rolfs, M., "Microsaccades: Small steps on a long way," Vision Res., 49(20): 2415-2441 (2009).
Rubinstein, M., et al., "Motion denoising with application to time-lapse photography," IEEE Computer Vision and Pattern Recognition, CVPR, pp. 313-320 (Jun. 2011).
Rubinstein, Miki, "Eulerian Video Magnification" You Tube, http://www.youtube.com/watch?v=ONZcjs1Pjmk, May 23, 2012, 3 pages.
Simoncelli, E.P. and Freeman, W.T., The steerable pyramid: a flexible architecture for multi-scale derivative computation, in Proc. of the 1995 Int'l Conf. on Image Proc., IEEE Computer Society, ICIP, Washington, DC, USA, 3: 3444 (1995).
Timoner, S.J., "Subpixel Motion Estimation from Sequences of Video Games", Massachusetts Institute of Technology, Jun. 1999.
Timoner, S.J. and Freeman, D.M., "Multi-Image Gradient-Based Algorithms for Motion Estimation", Optical Engineering 40(9) 2003-2016, Sep. 2001.
Unuma, Munetoshi et al., "Fourier principles for emotion-based human figure animation," Proceedings of the 22nd annual conference of Computer graphics and interactive techniques. ACM (1995).
Verkruysse, Wim et al., "Remote plethysmographic imaging using ambient light," Optics Express, 16.26, pp. 21434-21445, (2008).
Viola, Paul et al., "Robust real-time face detection," International Journal of Computer Vision, 57.2, pp. 137-154 (2004).
Wadhwa, Neal et al., "Riesz pyramids for fast phase-based video magnification," Computational Photography (ICCP), IEEE International Conference on IEEE (2014).
Wadhwa, Neal et al., "Phase-based video motion processing," ACM Transactions on Graphics (TOG), 32.4 (2013) 80.
Wang, J., et al., "The cartoon animation filter," ACM Trans. Graph., 25: 1169-1173 (2006).
Wu, H.-Y., et al., "Eulerian video magnification for revealing subtle changes in the world," ACM Trans. Graph. (Proc. SIGGRAPH), 31 (Aug. 2012).

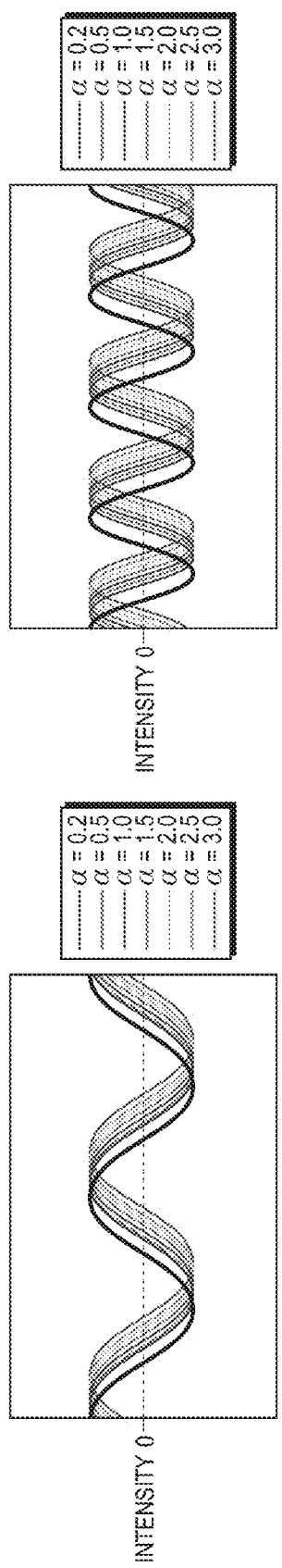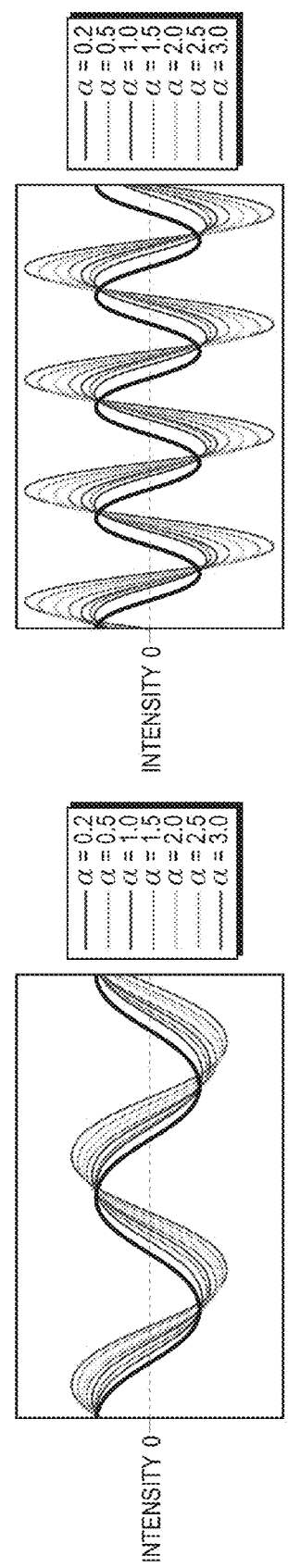

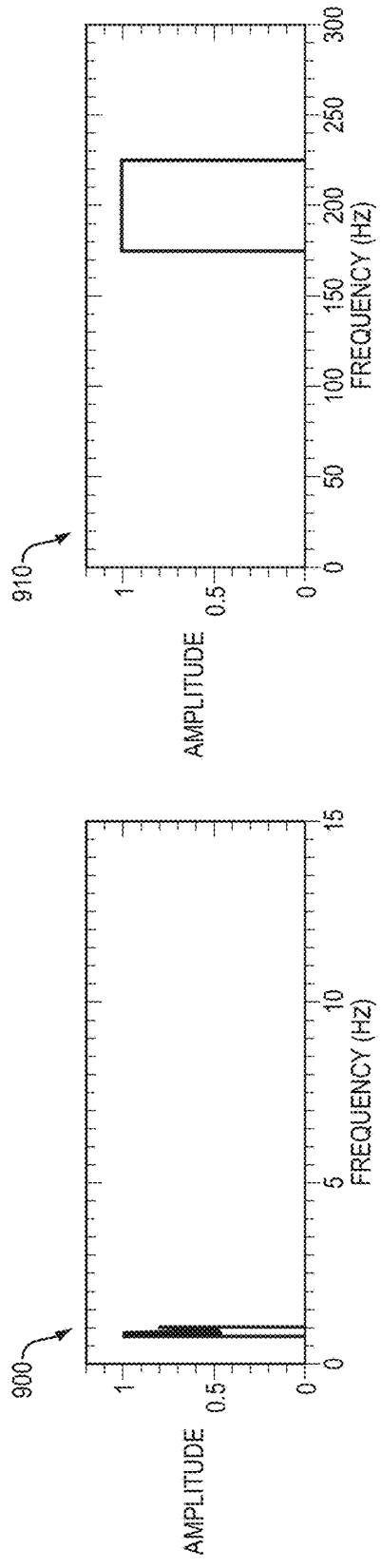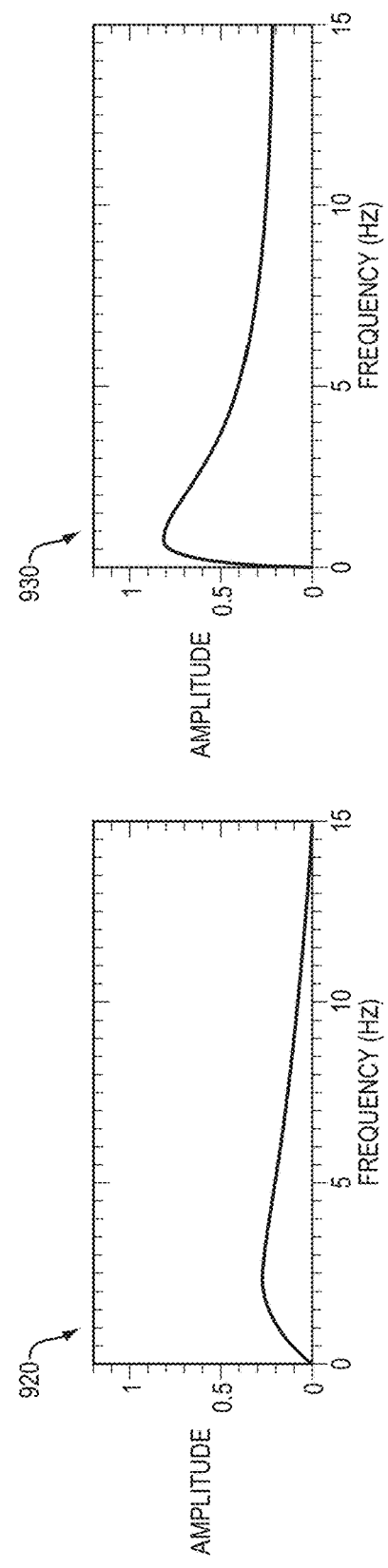

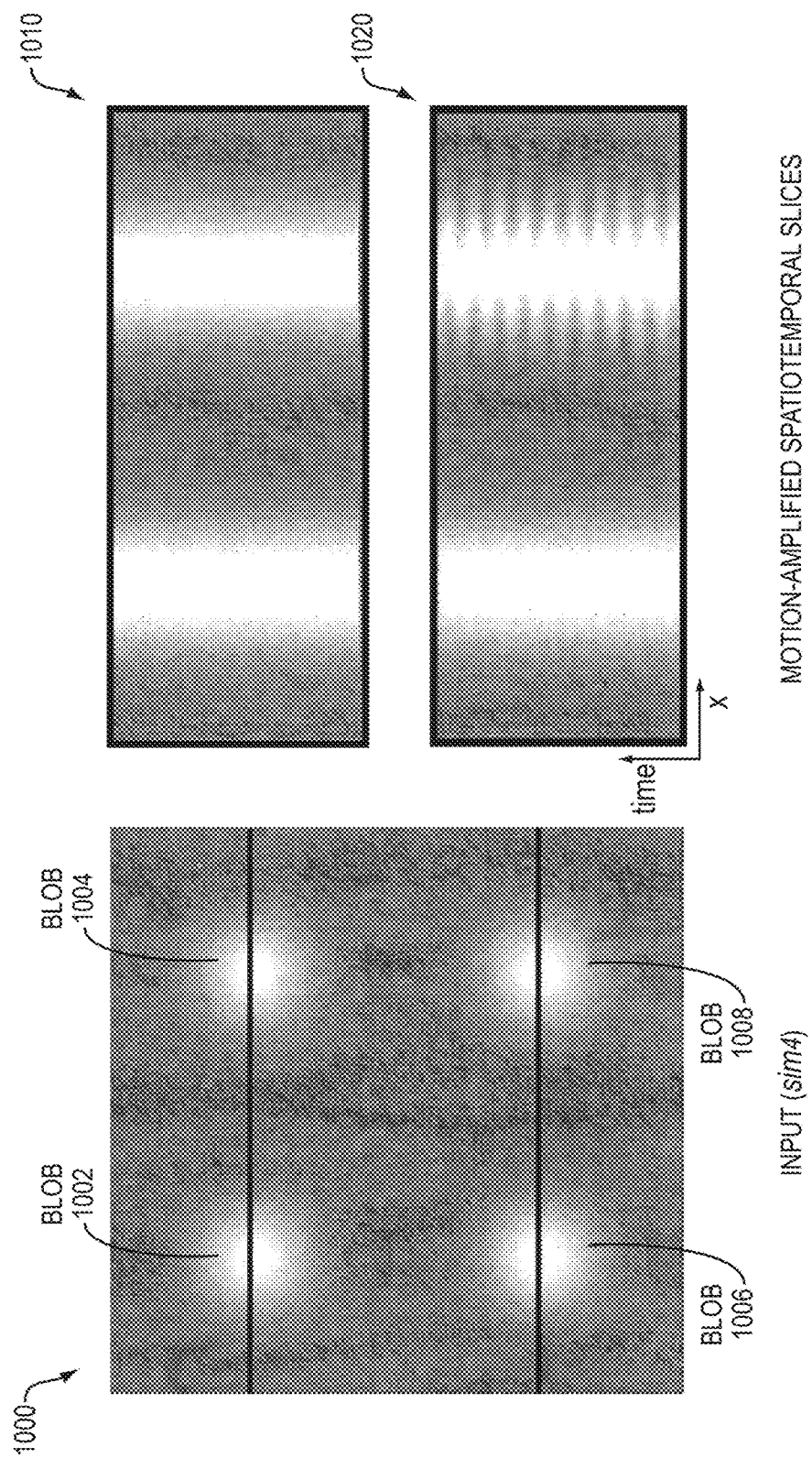

INSUFFICIENT SPATIAL POOLING

SUFFICIENT SPATIAL POOLING

INPUT NOISY FRAME

LINEAR-BASED EULERIAN MOTION MODULATION

RELATED APPLICATIONS

This application is a continuation of U.S. application Ser. No. 15/721,375, filed Sep. 29, 2017, which is a continuation of U.S. application Ser. No. 13/850,717, filed on Mar. 26, 2013, now U.S. Pat. No. 9,811,901, which is a continuation-in-part of U.S. application Ser. No. 13/607,173, filed on Sep. 7, 2012, now U.S. Pat. No. 9,805,475 and is also a continuation-in-part of U.S. application Ser. No. 13/707,451, filed on Dec. 6, 2012, now U.S. Pat. No. 9,324,005. The entire teachings of the above applications are incorporated herein by reference.

GOVERNMENT SUPPORT

This invention was made with government support under 1111415 from the National Science Foundation. The government has certain rights in the invention.

BACKGROUND OF THE INVENTION

The human visual system has limited spatio-temporal sensitivity, but many signals that fall below its sensitivity threshold can be informative. For example, human skin color varies slightly corresponding to blood circulation. This variation, while invisible to the naked eye, can be exploited to extract pulse rate or to visualize blood flow. Similarly, motion with low spatial amplitude, while hard or impossible for humans to see, can be magnified to reveal interesting mechanical behavior.

SUMMARY OF THE INVENTION

In one embodiment, a method of amplifying temporal variation in at least two images comprises examining pixel values of the at least two images. The temporal variation of the pixel values between the at least two images can be below a particular threshold. The method can further include applying signal processing to the pixel values.

In another embodiment, applying signal processing can amplify the variations of the pixel values between the at least two images. The signal processing can be temporal processing. The temporal processing can be a bandpass filter or be performed by a bandpass filter. The bandpass filter can be configured to analyze frequencies over time. Applying signal processing can include spatial processing. Spatial processing can remove noise.

In another embodiment, the method can include visualizing a pattern of flow of blood in a body shown in the at least two images.

In another embodiment, a system for amplifying temporal variation in at least two images can include a pixel examination module configured to examine pixel values of the at least two images. The temporal variation of the pixel values between the at least two images can be below a particular threshold. The system can further include a signal processing module configured to apply signal processing to the pixel values.

The signal processing module can be further configured to amplify variations of the pixel values between the at least two images. The signal processing module can be further configured to employ temporal processing. The temporal processing can be a bandpass filter or performed by a bandpass filter. The bandpass filter can be configured to analyze frequencies over time. The signal processing module can be further configured to perform spatial processing. The spatial processing can remove noise.

BRIEF DESCRIPTION OF THE DRAWINGS

The patent or application file contains at least one drawing executed in color. Copies of this patent or patent application publication with color drawings will be provided by the Office upon request and payment of the necessary fee.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 4A-D are charts illustrating motion amplification on a 1D signal for different spatial frequencies and a values.

FIGS. 9A-D are graphs illustrating the frequency responses of some of the temporal filters.

FIGS. 10A-B are diagrams illustrating selective motion amplification on a synthetic sequence.

DETAILED DESCRIPTION OF THE INVENTION

A description of example embodiments of the invention follows.

The method described herein (a) reveals temporal variations in videos that are difficult or impossible to see with the naked eye and (b) displays the temporal variations in an indicative manner. The method, called Eulerian Video Magnification, inputs a standard video sequence, applies spatial decomposition, and applies temporal filtering to the frames. The resulting signal is then amplified to reveal hidden information. This method can, for example, visualize flow of blood filling a face in a video and also amplify and reveal small motions. The method can run in real time to show phenomena occurring at temporal frequencies selected by the user.

Figure 1I:
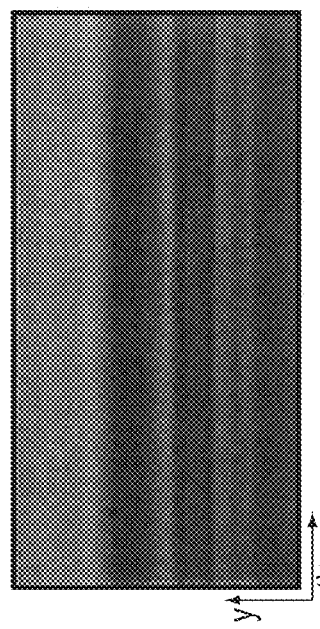
FIGS. 1I-J illustrate how Eulerian Video Magnification amplifies the periodic color variation.
Figure 1J:
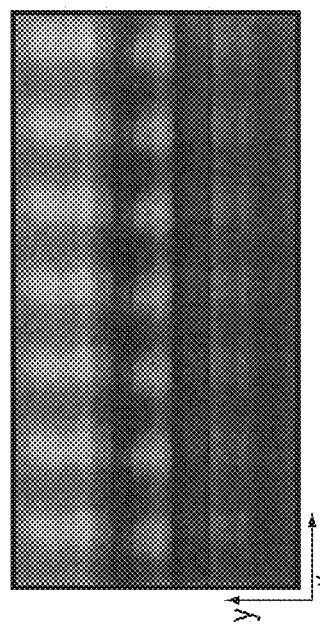
Figure 1D:
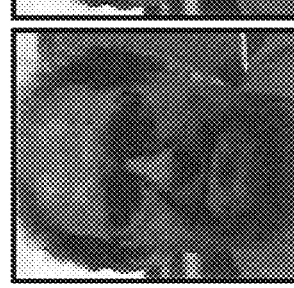
FIGS. 1A-H are example frames illustrating Eulerian Video Magnification framework for visualizing the human pulse in a series of frames.
Figure 1C:
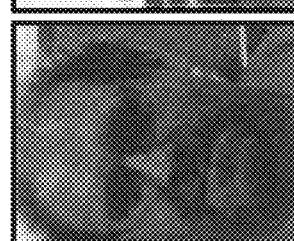
Figure 1B:
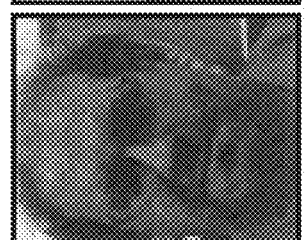
Figure 1A:
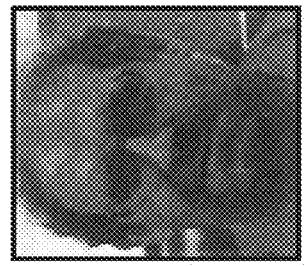
Figure 1H:
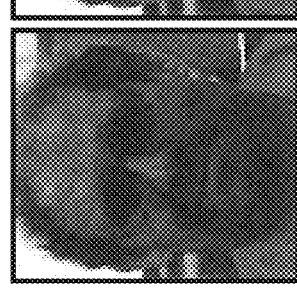
Figure 1G:
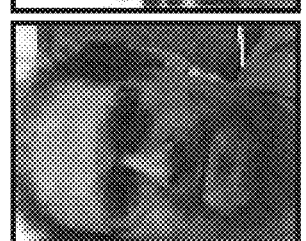
Figure 1F:
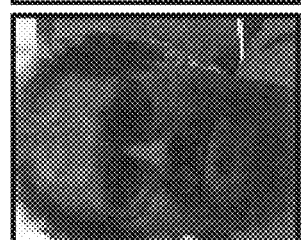
Figure 1E:
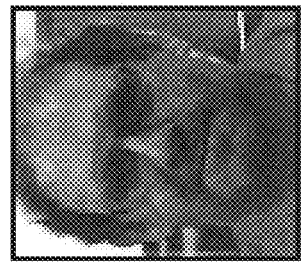

FIGS. 1A-H are example frames illustrating Eulerian Video Magnification framework for visualizing the human pulse in a series of frames. FIGS. 1A-D illustrate four frames from the original video sequence showing a face. FIGS. 1E-H illustrate four frames with the subject's pulse signal amplified. FIG. 1I is a chart illustrating a vertical scan line from the input and FIG. 1J is a chart illustrating a vertical scan line from the output videos plotted over time. FIGS. 1I-J illustrate how Eulerian Video Magnification amplifies the periodic color variation shown in spatiotemporal YT slices. In the input sequence (FIGS. 1A-D) the signal is imperceptible, but the variation is clear in the magnified sequence.

The success of these tools motivates the development of new techniques to reveal invisible signals in videos. A combination of spatial and temporal processing of videos can amplify subtle variations that reveal important aspects of the world.

The method described herein considers a time series of color values at any spatial location (e.g., a pixel) and amplifies variation in a given temporal frequency band of interest. For example, in FIG. 1, the method selects and then amplifies a band of temporal frequencies including plausible human heart rates. The amplification reveals the variation of redness as blood flows through the face. For this application, lower spatial frequencies are temporally filtered (spatial pooling) to allow a subtle input signal to rise above the camera sensor and quantization noise.

The temporal filtering approach not only amplifies color variation, but can also reveal low-amplitude motion. For example, the method can enhance the subtle motions around the chest of a breathing baby. The method's mathematical analysis employs a linear approximation related to the brightness constancy assumption used in optical flow formulations. The method also derives the conditions under which this approximation holds. This leads to a multiscale approach to magnify motion without feature tracking or motion estimation.

Previous attempts have been made to unveil imperceptible motions in videos. For example, a method, described in Liu et al. 2005, analyzes and amplifies subtle motions and visualizes deformations that are otherwise invisible. Another method, described in Wang et al. 2006, proposes using a Cartoon Animation Filter to create perceptually appealing motion exaggeration. These approaches follow a Lagrangian perspective, in reference to fluid dynamics where the trajectory of particles is tracked over time. As such, they rely on accurate motion estimation, which is computationally expensive and difficult to make artifact-free, especially at regions of occlusion boundaries and complicated motions. Moreover, the method of Liu et al. 2005 shows that additional techniques, including motion segmentation and image in-painting, are required to produce good quality synthesis. This increases the complexity of the algorithm further.

In contrast, the Eulerian perspective observes properties of a voxel of fluid, such as pressure and velocity, which evolve over time. The method studies and amplifies the variation of pixel values over time, in a spatially-multiscale manner. The Eulerian approach to motion magnification does not explicitly estimate motion, but rather exaggerates motion by amplifying temporal color changes at fixed positions. The method employs differential approximations that form the basis of optical flow algorithms.

Temporal processing has been used previously to extract invisible signals, such as in Poh et al. 2010 (hereinafter "Poh") and to smooth motions, such as in Fuchs et al. 2010 (hereinafter "Fuchs"). For example, Poh describes extracting a heart rate from a video of a face based on the temporal variation of the skin color, which is normally invisible to the human eye. Poh focuses on extracting a single number, whereas the method described herein employs localized spatial pooling and bandpass filtering to extract and reveal visually the signal corresponding to the pulse. This primal domain analysis allows amplification and visualization of the pulse signal at each location on the face. This has important potential monitoring and diagnostic applications to medicine, where, for example, the asymmetry in facial blood flow can be a symptom of arterial problems.

Fuchs uses per-pixel temporal filters to dampen temporal aliasing of motion in videos. Fuchs also describes the high-pass filtering of motion, but mostly for non-photorealistic effects and for large motions. In contrast, the method described herein strives to make imperceptible motions visible using a multiscale approach. The method described herein excels at amplifying small motions, in one embodiment.

First, nearly invisible changes in a dynamic environment can be revealed through Eulerian spatio-temporal processing of standard monocular video sequences. Moreover, for a range of amplification values that is suitable for various applications, explicit motion estimation is not required to amplify motion in natural videos. The method is robust and runs in real time. Second, an analysis of the link between temporal filtering and spatial motion is provided and shows that the method is best suited to small displacements and lower spatial frequencies. Third, a single framework can amplify both spatial motion and purely temporal changes (e.g., a heart pulse) and can be adjusted to amplify particular temporal frequencies—a feature which is not supported by Lagrangian methods. Fourth, we analytically and empirically compare Eulerian and Lagrangian motion magnification approaches under different noisy conditions. To demonstrate our approach, we present several examples where our method makes subtle variations in a scene visible.

Space-Time Video Processing

Figure 2:
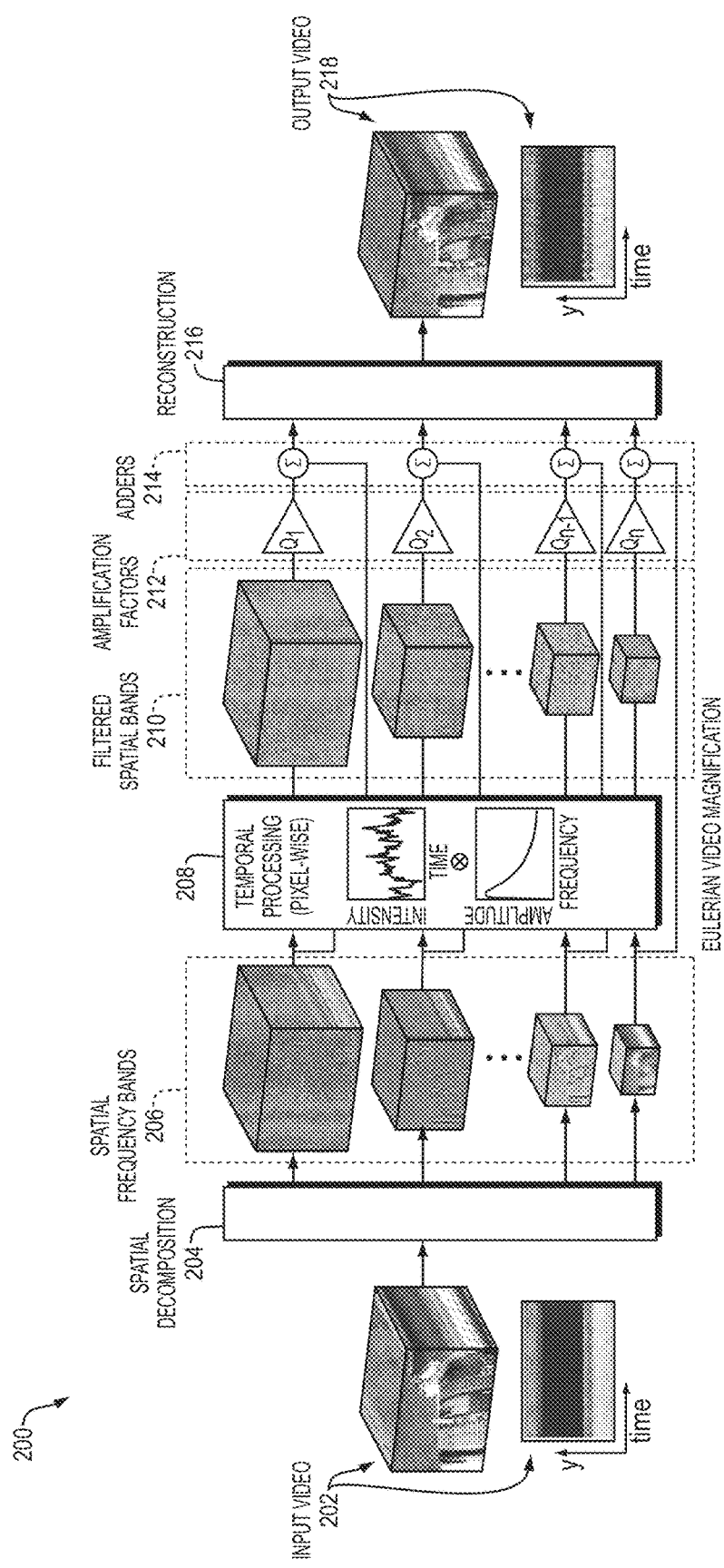
FIG. 2 is an illustration of a temporal processing module employing the Eulerian video magnification framework.

FIG. 2 is an illustration of a temporal processing module employing the Eulerian video magnification framework. The spatial decomposition module 204 of system first decomposes the input video 202 into different spatial frequency bands 206, then applies the same temporal filter to the spatial frequency bands 206. The outputted filtered spatial bands 210 are then amplified by an amplification factor 212, added back to the original signal by adders 214, and collapsed by a reconstruction module 216 to generate the output video 218. The temporal filter 208 and amplification factors 212 can be tuned to support different applications. For example, the system can reveal unseen motions of a Digital SLR camera, caused by the flipping mirror during a photo burst.

The method as illustrated by FIG. 2 combines spatial and temporal processing to emphasize subtle temporal changes in a video. The method decomposes the video sequence into different spatial frequency bands. These bands might be magnified differently because (a) they might exhibit different signal-to-noise ratios or (b) they might contain spatial frequencies for which the linear approximation used in motion magnification does not hold. In the latter case, the method reduces the amplification for these bands to suppress artifacts. When the goal of spatial processing is to increase temporal signal-to-noise ratio by pooling multiple pixels, the method spatially low-pass filters the frames of the video and downsamples them for computational efficiency. In the general case, however, the method computes a full Laplacian pyramid.

The method then performs temporal processing on each spatial band. The method considers the time series corresponding to the value of a pixel in a frequency band and applies a bandpass filter to extract the frequency bands of interest. As one example, the method may select frequencies within the range of 0.4-4 Hz, corresponding to 24-240 beats per minute, if the user wants to magnify a pulse. If the method extracts the pulse rate, it can employ a narrow frequency band around that value. The temporal processing is uniform for all spatial levels and for all pixels within each level. The method then multiplies the extracted bandpassed signal by a magnification factor $\alpha$. This factor can be specified by the user, and may be attenuated automatically according to guidelines described later in this application. Next, the method adds the magnified signal to the original signal and collapses the spatial pyramid to obtain the final output. Since natural videos are spatially and temporally smooth, and since the filtering is performed uniformly over the pixels, the method implicitly maintains spatiotemporal coherency of the results.

3 Eulerian Motion Magnification

The present method can amplify small motion without tracking motion as in Lagrangian methods. Temporal processing produces motion magnification, shown using an analysis that relies on the first-order Taylor series expansions common in optical flow analyses.

3.1 First-Order Motion

To explain the relationship between temporal processing and motion magnification, the case of a 1D signal undergoing translational motion is informative. This analysis generalizes to locally-translational motion in 2D.

Function $I(x, t)$ denotes the image intensity at position $x$ and time $t$. Since the image undergoes translational motion, can be expressed as the observed intensities with respect to a displacement function $\delta(t)$, $I(x, t) = f(x+\delta(t))$ and such that $I(x, 0) = f(x)$. The goal of motion magnification is to synthesize the signal $$\hat{I}(x,t) = f(x+1+\alpha)\delta(t)) \quad (1)$$

for some amplification factor $\alpha$. Assuming the image can be approximated by a first-order Taylor series expansion, the image at time $t$, $f(x+\delta(t))$ in a first-order Taylor expansion about $x$, can be written as $$I(x, t) \approx f(x) + \delta(t)\frac{\delta(f)(x)}{\delta x}. \quad (2)$$

Function $B(x, t)$ is the result of applying a broadband temporal bandpass filter to $I(x, t)$ at every position x (picking out everything except $f(x)$ in Eq. 2). For now, assume the motion signal, $\delta(t)$, is within the passband of the temporal bandpass filter. Then, $$B(x, t) = \delta(t)\frac{\delta f(x)}{\delta x} \quad (3)$$

The method then amplifies that bandpass signal by $\alpha$ and adds it back to $I(x, t)$, resulting in the processed signal $$\hat{I}(x,t) = I(x,t) + \alpha B(x,t). \quad (4)$$

Combining Eqs. 2, 3, and 4 results in $$\hat{I}(x, t) \approx f(x) + (1+\alpha)\delta(t)\frac{\delta f(x)}{\delta x} \quad (5)$$

Assuming the first-order Taylor expansion holds for the amplified larger perturbation, $(1+\alpha)\delta(t)$, the amplification of the temporally bandpassed signal can be related to motion magnification. The processed output is simply $$\hat{I}(x,t) \approx f(x+(1+\alpha)\delta(t)). \quad (6)$$

This shows that the processing magnifies motions—the spatial displacement $\delta(t)$ of the local image $f(x)$ at time t has been amplified to a magnitude of $(1+\alpha)$.

Figure 3:
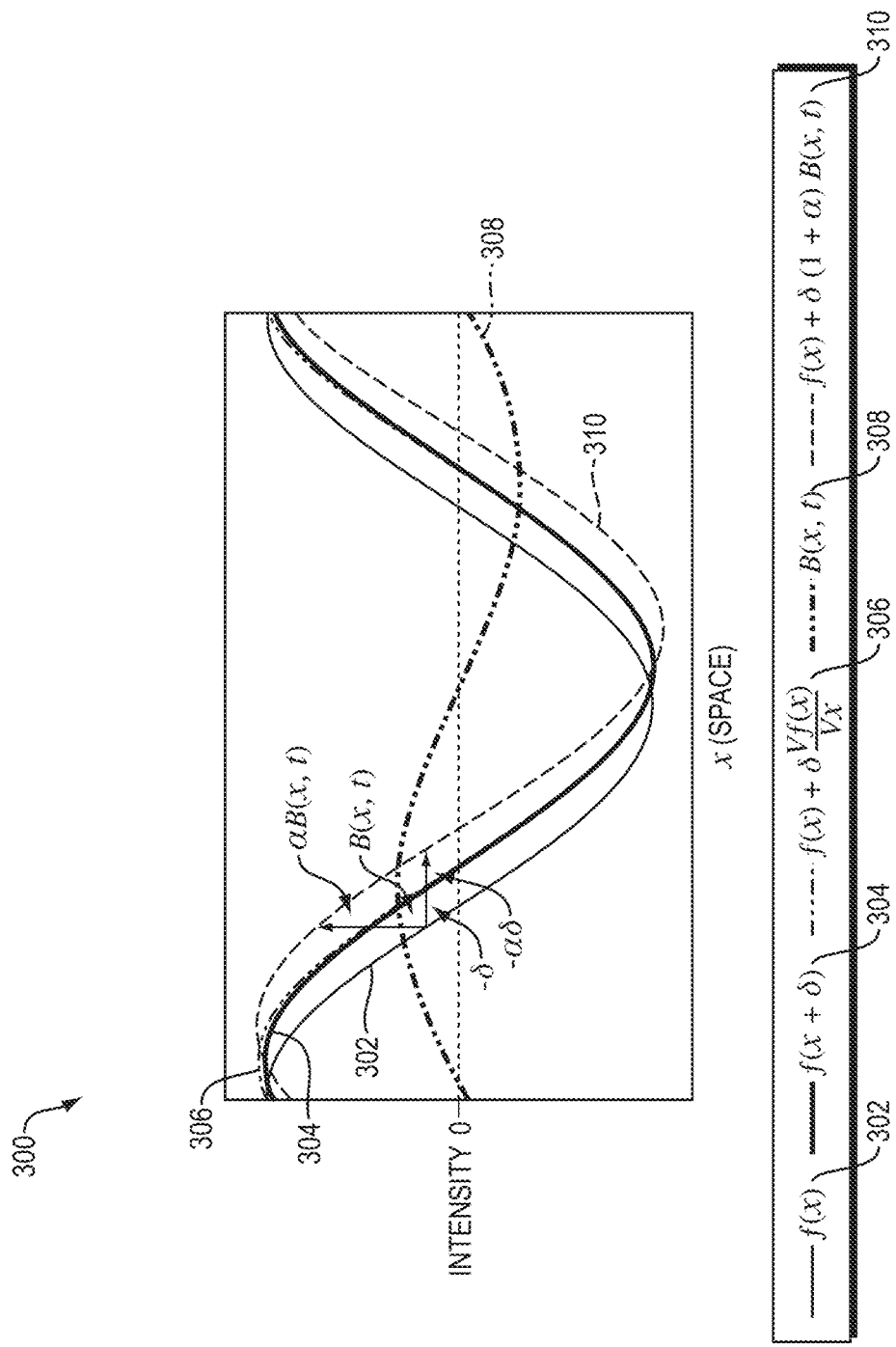
FIG. 3 is a chart illustrating that temporal filtering can approximate spatial translation.

FIG. 3 is a chart 300 illustrating that temporal filtering can approximate spatial translation. This effect is demonstrated here on a 1D signal, but applies to 2D. The input signal is shown at two time instants: $I(x, t) = f(x)$ at time t and $I(x, t+1) = f(x+\delta)$ at time t+1. The first order Taylor series expansion of $I(x, t+1)$ about x approximates the translated signal. The temporal bandpass is amplified and added to the original signal to generate a larger translation. In this example $\alpha=1$, magnifying the motion by 100%, and the temporal filter is a finite difference filter, subtracting the two curves.

This process is illustrated for a single sinusoid in FIG. 3. For a low frequency cosine wave and a relatively small displacement, $\delta(t)$, the first-order Taylor series expansion approximates the translated signal at time t+1. When boosting the temporal signal by $\alpha$ and adding it back to $I(x, t)$, the Taylor series approximates that the expansion wave is translated by $(1+\alpha)\delta$.

For completeness, in a more general case, $\delta(t)$ is not entirely within the passband of the temporal filter, $\delta k(t)$, indexed by k, and represents the different temporal spectral components of $\delta(t)$. Each $\delta k(t)$ is attenuated by the temporal filtering by a factor $\lambda k$. This results in a bandpassed signal, $$B(x, t) = \sum_k \gamma k \delta k(t) \frac{\delta f(x)}{\delta x} \quad (7)$$

(compare with Eq. 3). Because of the multiplication in Eq. 4, this temporal frequency dependent attenuation can equivalently be interpreted as a frequency-dependent motion magnification factor, $\alpha k = \lambda k \alpha$.

3.2 Bounds

In practice, the assumptions in Sect. 3.1 hold for smooth images and small motions. For quickly changing image functions (i.e., high spatial frequencies), $f(x)$, the first-order Taylor series approximations becomes inaccurate for large values of the perturbation, $1+\alpha\delta(t)$, which increases both with larger magnification a and motion $\delta(t)$. FIGS. 4 and 5 demonstrate the effect of higher frequencies, larger amplification factors and larger motions on the motion-amplified signal of a sinusoid.

As a function of spatial frequency, $\omega$, the process derives a guide for how large the motion amplification factor, $\alpha$, can be given the observed motion $\delta(t)$. For the processed signal, $\tilde{I}(x, t)$ to be approximately equal to the true magnified motion, $\hat{I}(x, t)$, the process seeks the conditions under which $$\tilde{I}(x,t) \approx \hat{I}(x,t) \quad (8)$$
$$\Rightarrow f(x) + (1+\alpha)\delta(t)\frac{\delta f(x)}{\delta x} \approx f(x) + (1+\alpha)\delta(t)$$

FIGS. 4A-D are charts illustrating motion amplification on a 1D signal for different spatial frequencies and $\alpha$ values. For FIGS. 4A and 4C, $\lambda=2\pi$ and $$\lambda = 2\pi \text{ and } \delta(1) = \frac{\pi}{8}$$

is the true translation. For FIGS. 4B and 4D, $\lambda=\pi$ and $$\lambda = \pi \text{ and } \delta(1) = \frac{\pi}{8}.$$

FIGS. 4A-B illustrate the true displacement (e.g., true motion amplification, true motion application being represented by $I(x,t)=f(x+(1+\alpha)\delta(t))$ of $I(x, 0)$ by $(1+\alpha)\delta(t)$ at time t=1, colored from blue (small amplification factor) to red (high amplification factor). FIG. 4C-D illustrate the amplified displacement (e.g., motion amplification via temporal filter, the motion amplification represented by $I(x,t)=I(x,t)+\alpha B(x,t))$ produced by the filter of the present method, with colors corresponding to the correctly shifted signals in (a). Referencing Eq. 13, the red (far right) curves of each plot correspond to $$(1+\alpha)\delta(t) = \frac{\lambda}{4}$$

for the left plot, and $$(1+\alpha)\delta(t) = \frac{\lambda}{2}$$

for the right plot, showing the mild, then severe, artifacts introduced in the motion amplification from exceeding the bound on $(1+\alpha)$ by factors of 2 and 4, respectively.

Figure 5B:
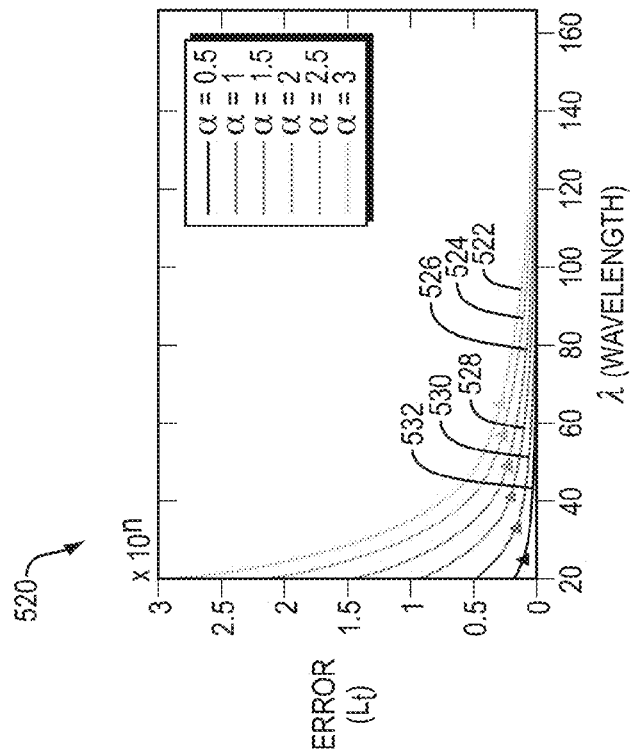
FIGS. 5A-B are charts illustrating motion magnification error, computed as the L1-norm between the true motion-amplified signal (FIG. 4A) and the temporally-filtered result (FIG. 4B), as function of wavelength, for different values of $\delta(t)$, (FIG. 5A), and $\alpha$, (FIG. 5B).
Figure 5A:
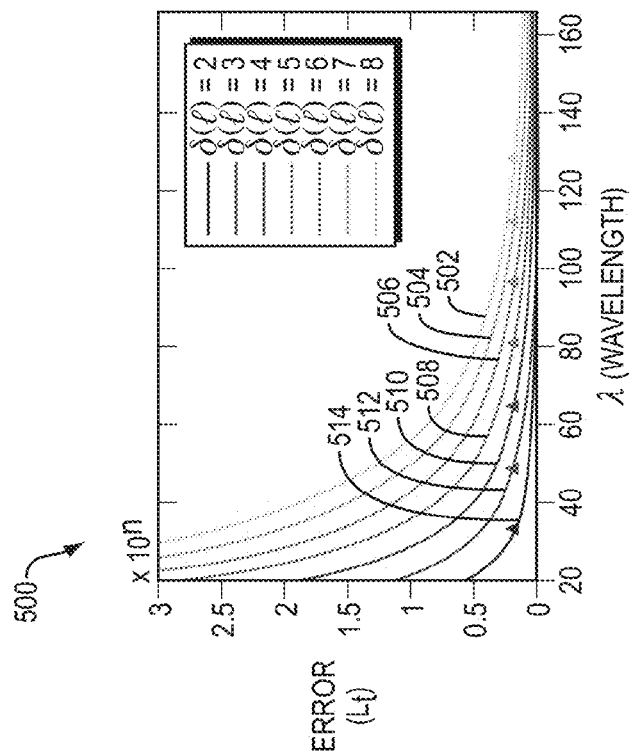

FIGS. 5A-B are charts 500 and 520, respectively, illustrating motion magnification error, computed as the L1-norm between the true motion-amplified signal (e.g., FIGS. 4A-B) and the temporally-filtered result (e.g., FIG. 4C-D), as function of wavelength, for variable values of $\delta(t)$ and a constant value of $\alpha$, (FIG. 5A), and variable values of $\alpha$ and a constant value of $\delta(t)$, (FIG. 5B). In FIG. 5A, the constant value of a is 1, and in FIG. 5B, the constant value of $\delta(t)$ is 2. The markers on each curve represent a derived cutoff point $$(1+\alpha)\delta(t) = \frac{\lambda}{8}. \quad (Eq. 13)$$

Let $f(x)=\cos(\omega x)$ for spatial frequency $\omega$, and denote $\beta=1+\alpha$. The process requires that $$\cos(\omega x)-\beta\omega\delta(t)\sin(\omega x)\approx\cos(\omega x+\beta\omega\delta(t)) \quad (9)$$

Using the addition law for cosines, $$\cos(\omega x)-\beta\omega\delta(t)\sin(\omega x)=\cos(\omega x)\cos \beta\omega\delta(t))-\sin(\omega x)\sin \beta\omega\delta(t)) \quad (10)$$

Hence, the following should approximately hold $$\cos \beta\omega\delta(t))\approx 1 \quad (11)$$

$$\sin \beta\omega\delta(t))\approx\beta\delta(t)\omega \quad (12)$$

Figure 6:
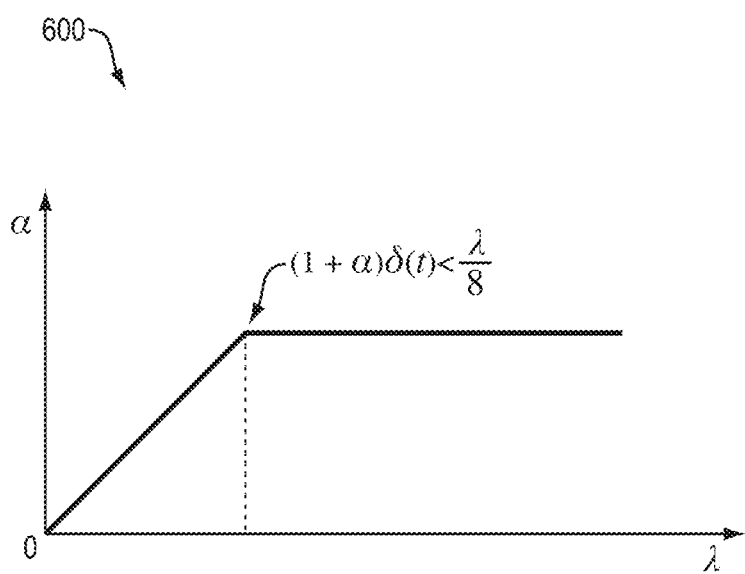
FIG. 6 is a graph illustrating amplification factor, $\alpha$, as a function of spatial wavelength $\lambda$, for amplifying motion.

FIG. 6 is a graph 600 illustrating a preferred amplification factor, $\alpha$, as a function of spatial wavelength $\lambda$, for amplifying motion. The preferred amplification factor is fixed to a for spatial bands that are within the derived bound (Eq. 13), and is attenuated linearly for higher spatial frequencies.

The small angle approximations of Eqs. (11) and (12) hold to within 10% for $$\beta\omega\delta(t) \le \frac{\pi}{4}$$

(the sine term is the leading approximation which gives $$\sin\left(\frac{\pi}{4}\right) = 0.9 * \frac{\pi}{4}).$$

In terms of the spatial wavelength, $$\lambda = \frac{2\pi}{\omega},$$

of the moving signal, this gives $$(1+\alpha)\delta(t) < \frac{\lambda}{8} \quad (13)$$

Eq. 13 above provides the sought after guideline, giving the largest motion amplification factor, $\alpha$, compatible with accurate motion magnification of a given video motion $\delta(t)$ and image structure spatial wavelength, $\lambda$. FIG. 4B shows the motion magnification errors for a sinusoid when a is boosted beyond the limit in Eq. 13. In some videos, violating the approximation limit can be perceptually preferred and the $\lambda$ cutoff is a user-modifiable parameter in the multiscale processing.

This suggests a scale-varying process: use a specified a magnification factor over some desired band of spatial frequencies, then scale back for the high spatial frequencies (found from Eq. 13 or specified by the user) where amplification gives undesirable artifacts. FIG. 6 shows such a modulation scheme for $\alpha$. Although areas of high spatial frequencies (sharp edges) are generally amplified less than lower frequencies, the resulting videos to contain perceptually appealing magnified motion. Such effect is also exploited in the earlier work of Freeman et al. [1991] to create the illusion of motion from still images.

Testing results can be generated using non-optimized MATLAB code on a machine with a six-core processor and 32 GB RAM. The computation time per video is on the order of a few minutes. A separable binomial filter of size five constructs the video pyramids. A prototype application allows users to reveal subtle changes in real-time from live video feeds, essentially serving as a microscope for temporal variations. It is implemented in C++, can be CPU-based, and processes 640×480 videos at 45 frames per second on a standard laptop, but can be further accelerated by utilizing GPUs.

To process an input video by Eulerian video magnification, a user takes four steps: (1) select a temporal bandpass filter; (2) select an amplification factor, $\alpha$; (3) select a spatial frequency cutoff (specified by spatial wavelength, $\lambda c$) beyond which an attenuated version of $\alpha$ is used; and (4) select the form of the attenuation for $\alpha$—either force $\alpha$ to zero for all $\lambda < \lambda c$, or linearly scale a down to zero. The frequency band of interest can be chosen automatically in some cases, but it is often important for users to be able to control the frequency band corresponding to their application. In our real-time application, the amplification factor and cutoff frequencies are all customizable by the user.

Figure 7B:
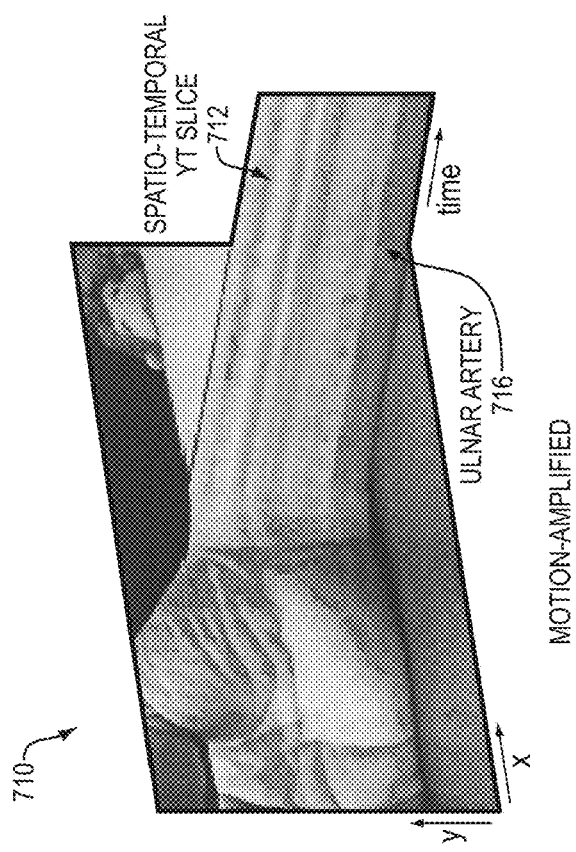
FIGS. 7A-B are illustrations showing Eulerian video magnification used to amplify subtle motions of blood vessels arising from blood flow.
Figure 7A:
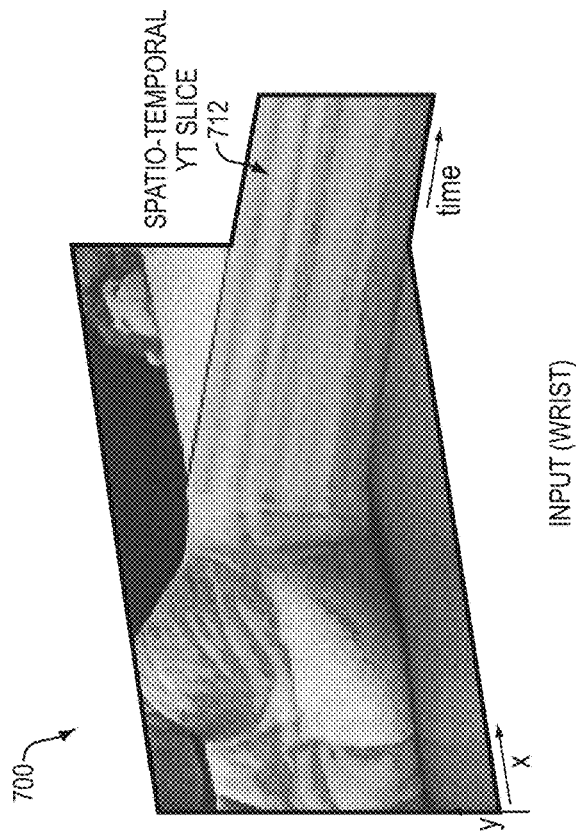

FIGS. 7A-B are illustrations 700 and 710, respectively, showing Eulerian video magnification used to amplify subtle motions of blood vessels (e.g., a radial artery 714 and an ulnar artery 716) arising from blood flow. For this video, the temporal filter is turned to a frequency band that includes the heart rate—0.88 Hz (53 bpm)—and the amplification factor is set to $\alpha=10$. To reduce motion magnification of irrelevant objects, a user-given mask amplifies the area near the wrist only. Movement of the radial artery 714 and the ulnar artery 716 can barely be seen in the input video of FIG. 7A taken with a standard point-and-shoot camera, but is significantly more noticeable in the motion-magnified output shown in FIG. 7B. The motion of the pulsing arteries is more visible when observing a spatio-temporal YT slice 712 of the wrist (a) and (b).

Figure 8:
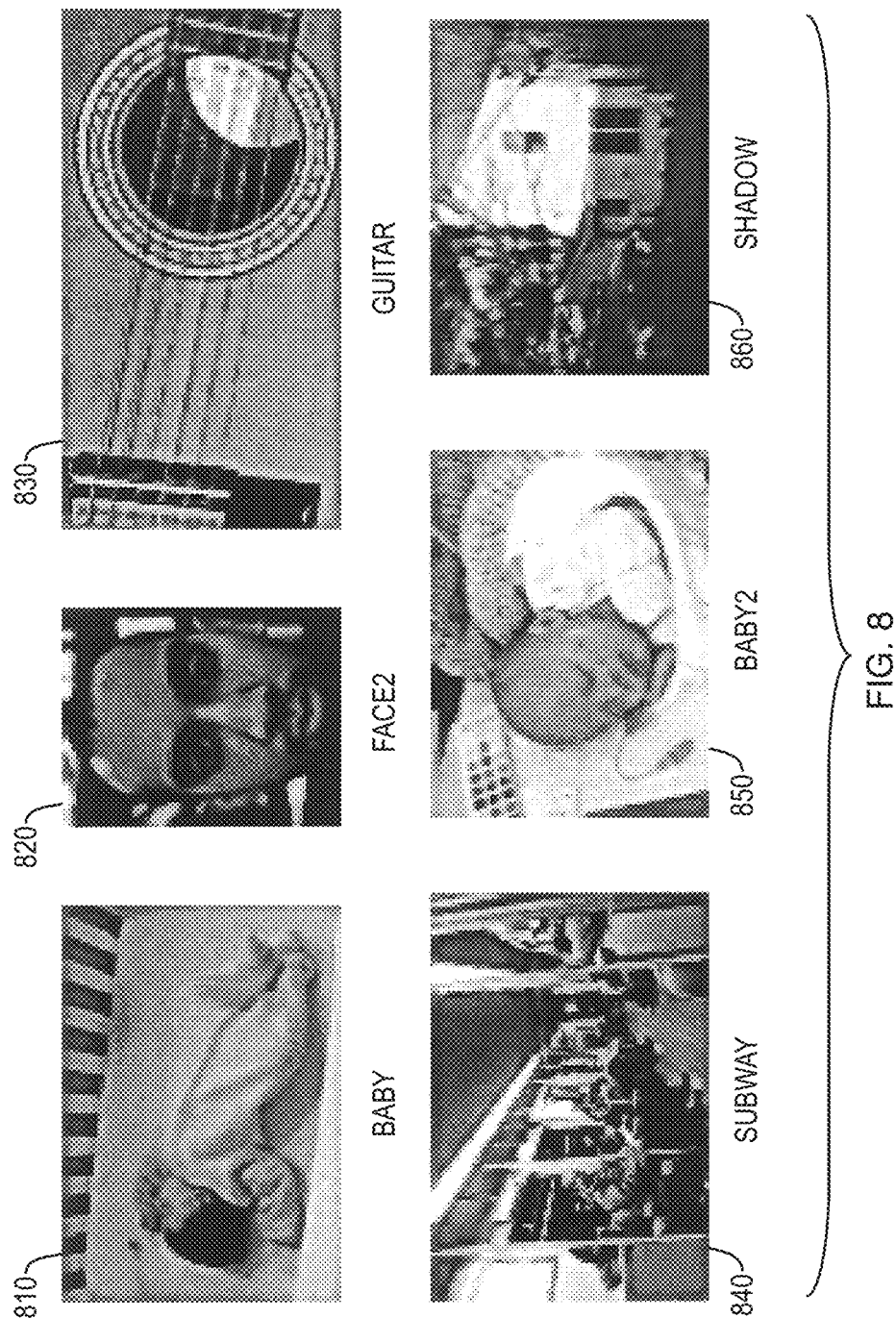
FIG. 8 illustrates representative frames 810, 820, 830, 840, 850, and 860 from additional videos demonstrating the process.

FIG. 8 illustrates representative frames 810, 820, 830, 840, 850, and 860 from additional videos demonstrating the process.

The process first selects the temporal bandpass filter to pull out the motions or signals to be amplified (step 1 above). The choice of filter is generally application dependent. For motion magnification, a filter with a broad passband is preferred; for color amplification of blood flow, a narrow passband produces a more noise-free result.

FIGS. 9A-D are graphs 900, 910, 920, and 930, respectively, illustrating the frequency responses of a respective temporal filters. Ideal bandpass filters are used for color amplification, since they have passbands with sharp cutoff frequencies. Low-order IIR filters can be useful for both color amplification and motion magnification and are convenient for a real-time implementation. In general, two first-order lowpass IIR filters with cutoff frequencies $\omega l$ and $\omega h$ are used to construct an IIR bandpass filter.

The process selects the desired magnification value, $\alpha$, and spatial frequency cutoff, $\lambda c$ (steps 2 and 3). While Eq. 13 can be a guide, in practice, a user can try various $\alpha$ and $\lambda c$ values to achieve a desired result. The user can select a higher a that violates the bound to exaggerate specific motions or color changes at the cost of increasing noise or introducing more artifacts. In some cases, the user can account for color clipping artifacts by attenuating the chrominance components of each frame. The method achieves this by doing all the processing in the YIQ space. The user can attenuate the chrominance components, I and Q, before conversion to the original color space.

For human pulse color amplification, where emphasizing low spatial frequency changes is essential, the process may force $\alpha=0$ for spatial wavelengths below $\lambda c$. For motion magnification videos, the user can choose to use a linear ramp transition for $\alpha$ (step 4).

The ideal filters, the frequency response of which is illustrated by graphs 900 and 910 of FIGS. 9A-B, are implemented using a discrete cosine transform (DCT). The graph 900 of FIG. 9A illustrates the frequency response of an ideal filter from 0.8-1 Hz. The graph 900 is a transform of the "face" video, the representative frame 820 of which is illustrated in FIG. 8. The graph 910 of FIG. 9B illustrates the frequency response of an ideal filter from 175-225 Hz. The graph 910 is a transform of the "guitar" video, the representative frame 830 of which is illustrated in FIG. 8. The Butterworth filter, the frequency response of which is illustrated by graph 920 of FIG. 9C, converts a user-specified frequency band to a second-order IIR structure and is used in our real-time application. The graph 920 of FIG. 9C illustrates the frequency response of the Butterworth filter from 3.6-6.2 Hz. The graph 920 is a transform of the "subway" video, the representative frame 840 of which is illustrated in FIG. 8. The second-order IIR filter, the frequency response of which is illustrated by graph 930 of FIG. 9D, also allows user input to perform its transform. Second-order filters have a broader passband than an ideal filter. The graph 930 of FIG. 9D illustrates the frequency response to a pulse detection.

The method was evaluated for color amplification using a few videos: two videos of adults with different skin colors and one of a newborn baby. An adult subject with lighter complexion is shown in face (e.g., FIG. 1), while an individual with darker complexion is shown in face2 (e.g., FIG. 8). In both videos, the objective is to amplify the color change as the blood flows through the face. In both face and face2, a Laplacian pyramid is applied and a is set for the finest two levels to 0. Essentially, each frame is downsampled and applied a spatial lowpass filter to reduce both quantization and noise and to boost the subtle pulse signal. For each video, the method then passes each sequence of frames through an ideal bandpass filter with a passband of 0.83 Hz to 1 Hz (50 bpm to 60 bpm). Finally, a large value of $\alpha \approx 100$ and $\lambda c \approx 1000$ is applied to the resulting spatially lowpass signal to emphasize the color change as much as possible. The final video is formed by adding this signal back to the original. The final video shows periodic green to red variations at the heart rate and how blood perfuses the face.

baby2 is a video of a newborn recorded in situ at the Nursery Department at Winchester Hospital in Massachusetts. In addition to the video, ground truth vital signs from a hospital grade monitor are obtained. This information confirms the accuracy of the heart rate estimate and verifies that the color amplification signal extracted from our method matches the photoplethysmogram, an optically obtained measurement of the perfusion of blood to the skin, as measured by the monitor.

FIGS. 10A-B are diagrams 1000, and 1010 and 1020, respectively, an synthetic input sequence (FIG. 10A) and respective selective motion amplification responses (FIG. 10B, 1010, 1020). The video sequence contains blobs 1002, 1004, 1006, 1008 oscillating at temporal frequencies of 7 Hz, 5 Hz, 3 Hz, and 2 Hz, respectively, as shown on the input frame. The method uses an ideal temporal bandpass filter of 1-3 Hz to amplify only the motions occurring within the specified passband. In FIG. 10B, the spatio-temporal slices from the resulting video show the different temporal frequencies and the amplified motion of the blob oscillating at 2 Hz. The space-time processing is applied uniformly to all the pixels.

To evaluate the method for motion magnification, several different videos are tested: face (FIG. 1), sim4 (FIG. 10), wrist (FIGS. 7A-B), camera (FIG. 2), face2, guitar, baby, subway, shadow, and baby2 (FIG. 8). For all videos, a standard Laplacian pyramid for spatial filtering is used. For videos where motions at specific temporal frequencies (e.g., in sim4 and guitar) are to be emphasized, the method employs ideal bandpass filters. In sim4 and guitar, the method can selectively amplify the motion of a specific blob or guitar string by using a bandpass filter tuned to the oscillation frequency of the object of interest. These effects can be observed in the supplemental video. The values used for α and λc for all of the videos are shown in Table 1.

For videos where revealing broad, but subtle motion is desired, the method employs temporal filters with a broader passband. For example, for the face2 video, the method employs a second-order IIR filter with slow roll-off regions. By changing the temporal filter, the method magnifies the motion of the head rather than amplifying the change in the skin color. Accordingly, α=20; λc=80 are chosen to magnify the motion.

By using broadband temporal filters and setting α and λc according to Eq. 14, the method is able to reveal subtle motions, as in the camera and wrist videos. For the camera video, a camera with a sampling rate of 300 Hz records a Digital SLR camera vibrating while capturing photos at about one exposure per second. The vibration caused by the moving mirror in the SLR, though invisible to the naked eye, is revealed by our approach. To verify that the method amplifies the vibrations caused by the flipping mirror, a laser pointer is secured to the camera and a video of the laser light recorded, appearing at a distance of about four meters from the source. At that distance, the laser light visibly oscillated with each exposure, with the oscillations in sync with the magnified motions.

The method exaggerates visible yet subtle motion, as seen in the baby, face2, and subway videos. In the subway example the method amplified the motion beyond the derived bounds of where the first-order approximation holds to increase the effect and to demonstrate the algorithm's artifacts. Many testing examples contain oscillatory movements because such motion generally has longer duration and smaller amplitudes. However, the method can amplify non-periodic motions as well, as long as they are within the passband of the temporal bandpass filter. In shadow, for example, the method processes a video of the sun's shadow moving linearly, yet imperceptibly, to the human eye over 15 seconds. The magnified version makes it possible to see the change even within this short time period.

TABLE 1

Table 1: Table of α, λc, ωt; ωh values used to produce the various output videos. For face2, two different sets of parameters are used-one for amplifying pulse, another for amplifying motion. For guitar, different cutoff frequencies and values for (α, λc) are used to "select" the different oscillating guitar strings. fs is the frame rate of the camera.

| Video | α | λc | ωt (Hz) | ωh (Hz) | fs (Hz) |
|---|---|---|---|---|---|
| baby | 10 | 16 | 0.4 | 3 | 30 |
| baby2 | 150 | 600 | 2.33 | 2.67 | 30 |
| camera | 120 | 20 | 45 | 100 | 300 |
| face | 100 | 1000 | 0.83 | 1 | 30 |
| face2 motion | 20 | 80 | 0.83 | 1 | 30 |
| face2 pulse | 120 | 960 | 0.83 | 1 | 30 |
| guitar Low E | 50 | 40 | 72 | 92 | 600 |
| guitar A | 100 | 40 | 100 | 120 | 600 |
| shadow | 5 | 48 | 0.5 | 10 | 30 |
| subway | 60 | 90 | 3.6 | 6.2 | 30 |
| wrist | 10 | 80 | 0.4 | 3 | 30 |

Finally, videos may contain regions of temporal signals that do not need amplification, or that, when amplified, are perceptually unappealing. Due to Eulerian processing, the user can manually restrict magnification to particular areas by marking them on the video.

Sensitivity to Noise. The amplitude variation of the signal of interest is often much smaller than the noise inherent in the video. In such cases direct enhancement of the pixel values do not reveal the desired signal. Spatial filtering can enhance these subtle signals. However, if the spatial filter applied is not large enough, the signal of interest is not be revealed, as in FIG. 11.

Assuming that the noise is zero-mean white and wide-sense stationary with respect to space, spatial low pass filtering reduces the variance of the noise according to the area of the low pass filter. To boost the power of a specific signal (e.g., the pulse signal in the face) the spatial characteristics of the signal can estimate the spatial filter size.

Let the noise power level be σ2, and the prior signal power level over spatial frequencies be S(λ). An ideal spatial low pass filter has radius r such that the signal power is greater than the noise in the filtered frequency region. The wavelength cut off of such a filter is proportional to its radius, r, so the signal prior can be represented as S(r). The noise power σ2 can be estimated by examining pixel values in a stable region of the scene, from a gray card. Since the filtered noise power level, σ'2, is inversely proportional to r2, the radius r can be found with, $$S(r) = \sigma'2 = k\frac{\sigma 2}{r2} \quad (14)$$

where k is a constant that depends on the shape of the low pass filter. This equation gives an estimate for the size of the spatial filter needed to reveal the signal at a certain noise power level.

Eulerian vs. Lagrangian Processing. Because the two methods take different approaches to motion—Lagrangian approaches explicitly track motions, while Eulerian approach does not—they can be used for complementary motion domains. Lagrangian approaches enhance motions of fine point features and support larger amplification factors, while the Eulerian method is better suited to smoother structures and small amplifications. The Eulerian method does not assume particular types of motions. The first-order Taylor series analysis can hold for general small 2D motions along general paths.

Figure 11B:
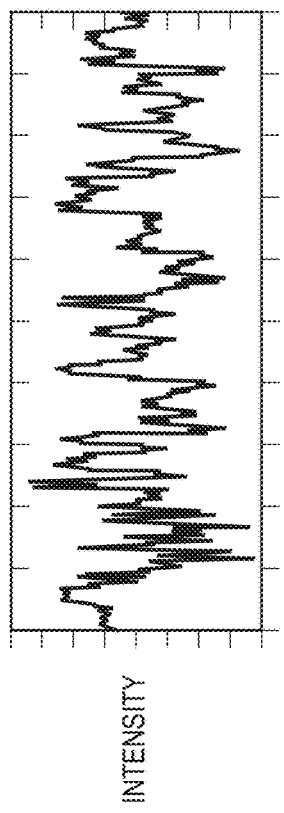
FIG. 11B illustrates intensity traces over time for the pixel marked blue on the input frame, showing the trace obtained when the (noisy) sequence is processed with the same spatial filter used to process the original face sequence, a separable binomial filter of size 20.
Figure 11C:
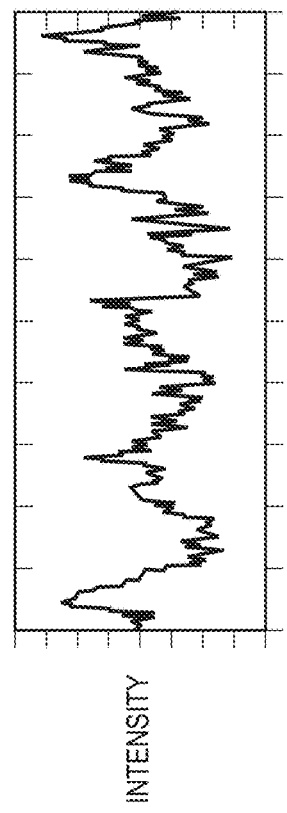
FIG. 11C shows the trace when using a filter tuned according to the estimated radius in Eq. 15, a binomial filter of size 80.
Figure 11A:
FIG. 11A illustrates frame from the face video (FIG. 1) with white Gaussian noise added.

FIG. 11A illustrates frame from the face video (FIG. 1) with white Gaussian noise (σ=0.1 pixel) added. FIG. 11B illustrates intensity traces over time for the pixel marked blue on the input frame, showing the trace obtained when the (noisy) sequence is processed with the same spatial filter used to process the original face sequence, a separable binomial filter of size 20. FIG. 11C shows the trace when using a filter tuned according to the estimated radius in Eq. 14, a binomial filter of size 80. The pulse signal is not visible in FIG. 11B, as the noise level is higher than the power of the signal, while in FIG. 11C the pulse is clearly visible (the periodic peaks about one second apart in the trace).

Appendix A provides estimates of the accuracy of the two approaches with respect to noise. Comparing the Lagrangian error, $\mathcal{E} L$ (Eq. 28), and the Eulerian error, $\mathcal{E} E$ (Eq. 30), both methods are equally sensitive to the temporal characteristics of the noise, nt, while the Lagrangian process has additional error terms proportional to the spatial characteristics of the noise, nx, due to the explicit estimation of motion (Eq. 26). The Eulerian error, on the other hand, grows quadratically with α, and is more sensitive to high spatial frequencies (Ixx). In general, this means that Eulerian magnification is preferable over Lagrangian magnification for small amplifications and larger noise levels.

Figure 12A:
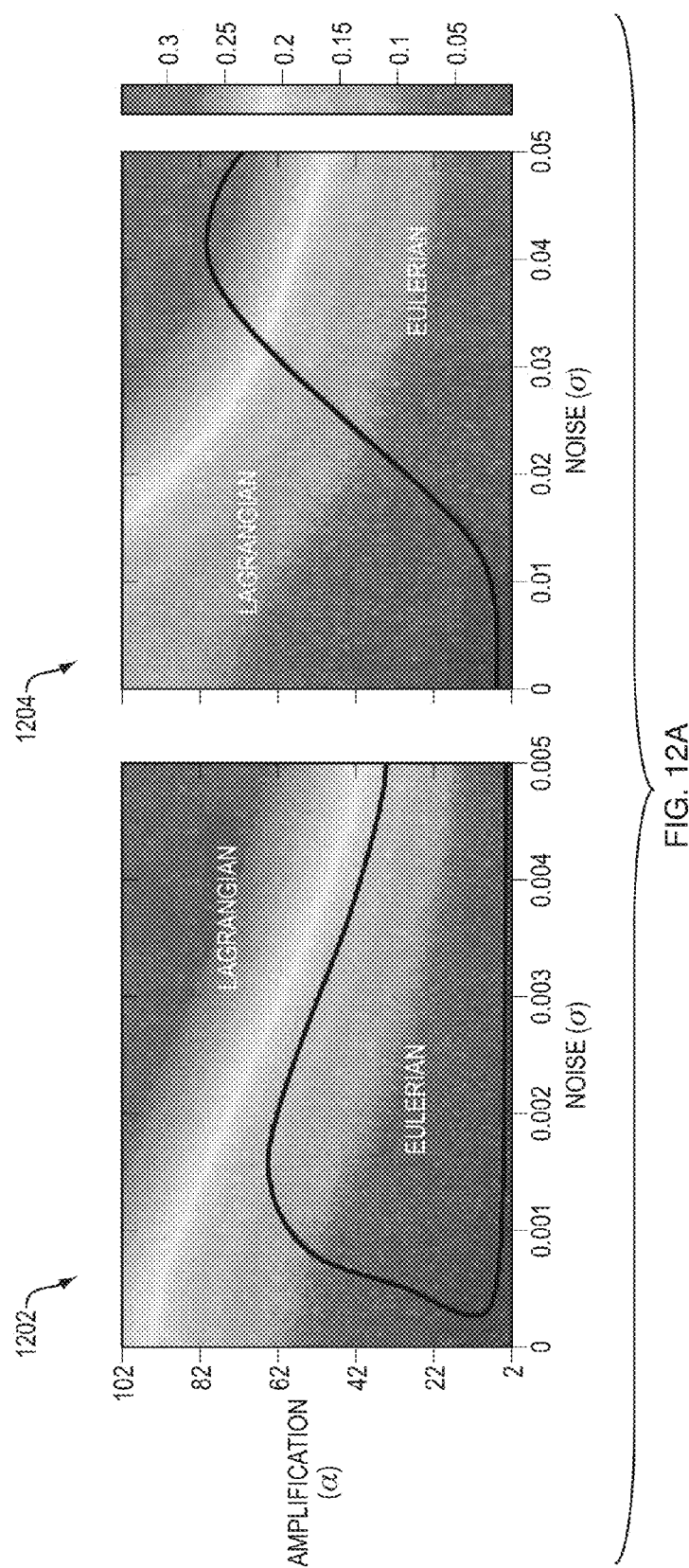
FIGS. 12A-C are diagrams illustrating a comparison between Eulerian and Lagrangian motion magnification on a synthetic sequence with additive noise.
Figure 12B:
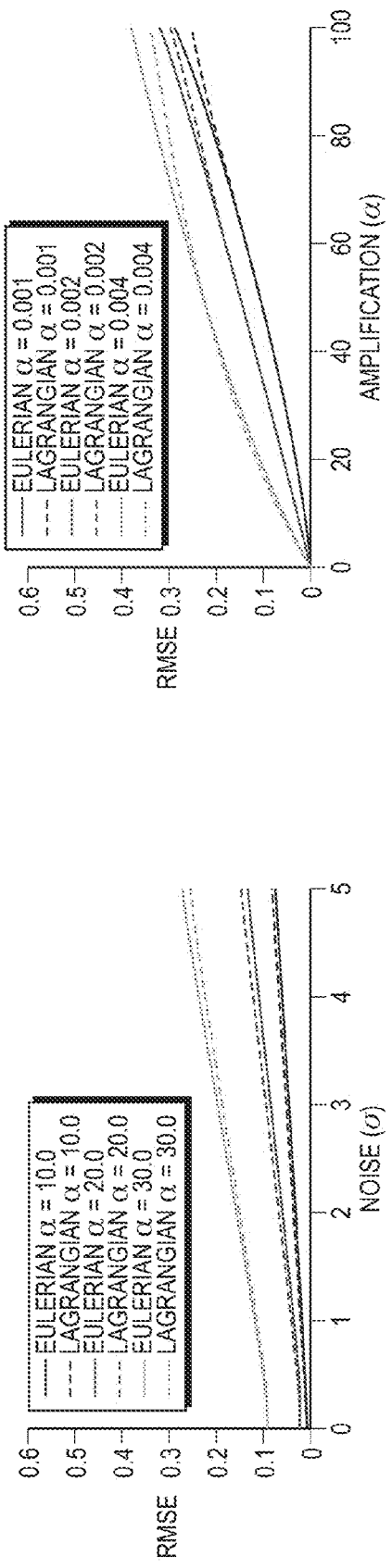
Figure 12C:
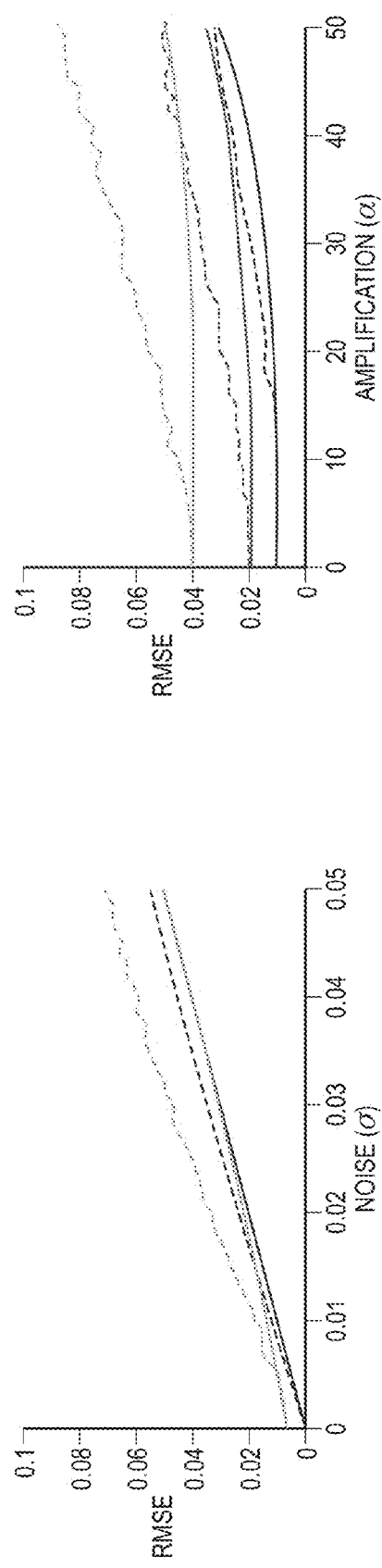

This analysis is validated on a synthetic sequence of a 2D cosine oscillating at 2 Hz temporally and 0.1 pixels spatially with additive white spatiotemporal Gaussian noise of zero mean and standard deviation σ (FIG. 12). The results match the error-to-noise and error-to-amplification relationships predicted by the derivation (FIG. 12B)). The region where the Eulerian approach outperforms the Lagrangian results (FIG. 12A, left) is also as expected. The Lagrangian method is more sensitive to increases in spatial noise, while the Eulerian error is hardly affected by it (FIG. 12C). While different regularization schemes used for motion estimation (that are harder to analyze theoretically) may alleviate the Lagrangian error, they do not change the result significantly (FIG. 12A, right). In general, for small amplifications, the Eulerian approach strikes a better balance between performance and efficiency.

The method takes a video as input and exaggerates subtle color changes and imperceptible motions. To amplify motion, the method does not perform feature tracking or optical flow computation, but merely magnifies temporal color changes using spatio-temporal processing. This Eulerian based method, which temporally processes pixels in a fixed spatial region, successfully reveals informative signals and amplifies small motions in real-world videos.

Eulerian and Lagrangian Error

This section estimates the error in the Eulerian and Lagrangian motion magnification with respect to spatial and temporal noise. The derivation is performed again in 1D for simplicity, and can be generalized to 2D.

Both methods approximate the true motion-amplified sequence, $\hat{I}(x, t)$, as shown in (1). First, analyze the error in those approximations on the clean signal, $I(x, t)$.

Without noise: In the Lagrangian approach, the motion amplified sequence, $\tilde{I}_L(x, t)$, is achieved by directly amplifying the estimated motion, (t), with respect to the reference frame, $I(x, 0)$ $$\tilde{I}_L(x,t)=I(x+(1+\alpha)\tilde{\delta}(t),0) \tag{15}$$

In its simplest form, δ(t) can be estimated in a point-wise manner $$\tilde{\delta}(t) = \frac{I_t(x, t)}{I_x(x, t)} \tag{16}$$

where $Ix(x, t)=\partial I(x, t)/\partial x$ and $It(x, t)=I(x, t)-I(x, 0)$. From now on, the space (x) and time (t) indices are omitted when possible for brevity.

The error in the Lagrangian solution is directly determined by the error in the estimated motion, which is the second-order term in the brightness constancy equation, $$I(x, t) \approx I(x, 0) + \delta(t)I_x + \frac{1}{2}\delta^2(t)I_{xx} \Rightarrow \frac{I_t}{I_x} \approx \delta(t) + \frac{1}{2}\delta^2(t)I_{xx} \tag{17}$$

The estimated motion, $\tilde{\delta}(t)$, is related to the true motion, δ(t), by $$\tilde{\delta}(t) \approx \delta(t) + \tfrac{1}{2}\delta^2(t)I_{xx} \tag{18}$$

Plugging (18) in (15) and using a Taylor expansion of I about $x+(1+\alpha)\delta(t)$ gives, $$\tilde{I}_L(x,t) \approx I(x+(1+\alpha)\delta(t),0)+\tfrac{1}{2}(1+\alpha)\delta^2(t)I_{xx}I_x \tag{19}$$

Subtracting (1) from (19), the error in the Lagrangian motion magnified sequence, $\mathcal{E} L$, is $$\varepsilon_L \approx |\tfrac{1}{2}(1+\alpha)\delta^2(t)I_{xx}I_x| \tag{20}$$

In the Eulerian approach, the magnified sequence, $\hat{I}_E(x, t)$, is $$\tilde{I}_E(x,t)=I(x,t)+\alpha I_t(x,t)=I(x,0)+(1+\alpha)I_t(x,t) \tag{21}$$

similar to (4), using a two-tap temporal filter to compute It. Using a Taylor expansion of the true motion-magnified sequence, $\hat{I}$ defined in (1), about x gives, $$\hat{I}(x,t) \approx I(x,0)+(1+\alpha)\delta(t)I_x+\tfrac{1}{2}(1+\alpha)^2\delta^2(t)I_{xx} \tag{22}$$

Using (17) and subtracting (1) from (22), the error in the Eulerian motion-magnified sequence, $\mathcal{E} E$, is $$\varepsilon_L \approx |\tfrac{1}{2}(1+\alpha)^2\delta^2(t)I_{xx}-\tfrac{1}{2}(1+\alpha)\delta^2(t)I_{xx}I_x| \tag{23}$$

With noise: Let I'(x, t) be the noisy signal, such that $$I'(x,t)=I(x,t)+n(x,t) \tag{24}$$

for additive noise n(x; t).

The estimated motion in the Lagrangian approach becomes $$\tilde{\delta}(t) = \frac{I'_t}{I'_x} \frac{I_t + n_t}{I_x + n_x} \tag{25}$$

where $nx=\partial n/\partial x$ and $nt=n(x, t)-n(x, 0)$. Using a Taylor Expansion on (nt, nx) about (0, 0) (zero noise), and using (17), gives $$\tilde{\delta}(t) \approx \delta(t) + \frac{n_t}{I_x} - n_x \frac{I_t}{I_x^2} + \frac{1}{2}\delta^2(t)I_{xx} \tag{26}$$

Plugging (26) into (15), and using a Taylor expansion of I about $x+(1+\alpha)\delta(t)$, gives $$\tilde{I}'_L(x,t) \approx I(x+(1+\alpha)\delta(t),0) + \quad (27)$$

$$(1+\alpha)I_x\left(\frac{n_t}{I_x} - n_x\frac{I_t}{I_x^2} + \frac{1}{2}\delta^2(t)I_{xx}\right) + n$$

Using (18) again and subtracting (1), the Lagrangian error as a function of noise, $\varepsilon L(n)$, is $$\varepsilon\_L(n) \approx |(1+\alpha)n\_t + \frac{1}{2}(1+\alpha)^2\delta^2(t)I_{xx} - \frac{1}{2}(1+\alpha)\delta^2(t)I_{xx}I_x + n| \quad (28)$$

In the Eulerian approach, the noisy motion-magnified sequence becomes $$\tilde{I}'_E(x,t) = I'(x,0) + (1+\alpha)I'_t = I(x,0) + (1+\alpha)(I_t+n_t) + n \quad (29)$$

Using (23) and subtracting (1), the Eulerian error as a function of noise, $\varepsilon E(n)$, is $$\varepsilon_E(n) \approx |(1+\alpha)n_t + \frac{1}{2}(1+\alpha)^2\delta^2(t)I_{xx} - \frac{1}{2}(1+\alpha)\delta^2(t)I_{xx}I_x + n| \quad (30)$$

If the noise is set to zero in (28) and (30), the resulting errors correspond to those derived for the non-noisy signal as shown in (20) and (23).

FIGS. 12A-C are diagrams illustrating a comparison between Eulerian and Lagrangian motion magnification on a synthetic sequence with additive noise. FIG. 12A shows diagrams 1202 and 1204 illustrating the minimal error, min($\varepsilon E, \varepsilon L$), computed as the (frame-wise) RMSE between each method's result and the true motion-magnified sequence, as function of noise and amplification, colored from blue (small error) to red (large error). Graph 1202 illustrates the minimal error with spatial regularization in the Lagrangian method, and graph 1204 illustrates the minimal error without spatial regularization in the Lagrangian method. The black curves mark the intersection between the error surfaces, and the overlayed text indicate the best performing method in each region. FIG. 11B shows RMSE of the two approaches as function of noise (left) and amplification (right).

In this section Supplemental Information estimates of the error in the Eulerian and Lagrangian motion magnification results with respect to spatial and temporal noise are derived. The derivation is done again for the 1D case for simplicity, and can be generalized to 2D. The true motion-magnified sequence is $$\hat{I}(x,t) = \hat{I}(x+(1+\alpha)\delta(t)) = I(x+(1+\alpha)\delta(t),0) \quad (31)$$

Both methods approximate the true motion-amplified sequence, $\hat{I}(x, t)$ (Eq. 31). First, the error in those approximations on the clean signal, I(x, t), is analyzed.

1.1 Without Noise

In the Lagrangian approach, the motion-amplified sequence, $\tilde{I}L(x, t)$, is achieved by directly amplifying the estimated motion, $\tilde{\delta}(t)$, with respect to the reference frame I(x, 0)

$$\tilde{I}_L(x,t) = I(x+(1+\alpha)\tilde{\delta}(t),0) \quad (32)$$

In its simplest form, $\delta(t)$ can be estimated using pointwise brightness constancy $$\tilde{\delta}(t) = \frac{I_t(x,t)}{I_x(x,t)} \quad (33)$$

where Ix(x, t)=∂I(x, t)/∂x and It(x, t)=I(x, t)−I(x, 0). From now on, space (x) and time (t) indices are omitted when possible for brevity.

The error in the Lagrangian solution is directly determined by the error in the estimated motion, which is the second-order term in the brightness constancy equation $$I(x,t) = \quad (34)$$

$$I(x+\delta(t),0) \approx I(x,0) + \delta(t)I_x + \frac{1}{2}\delta^2(t)I_{xx} \approx \delta(t)\frac{I_t}{I_x} \approx \delta(t) + \frac{1}{2}\delta^2(t)I_{xx}$$

So that the estimated motion $\tilde{\delta}(t)$ is related to the true motion, $\delta(t)$, as $$\tilde{\delta}(t) \approx \delta(t) + \frac{1}{2}\delta^2(t)I_{xx} \quad (35)$$

Plugging (35) in (32), $$\tilde{I}_L(x,t) \approx I(x+(1+\alpha)(\delta(t)+\frac{1}{2}\delta^2(t)I_{xx}), I_{xx}) \approx I(x+(x+(1+\alpha)\delta(t)+\frac{1}{2}(1+\alpha)\delta^2(t)I_{xx},0) \quad (36)$$

Using first-order Taylor expansion of I about x+(1+α)δ(t), $$\tilde{I}_E(x,t) \approx I(x+(1+\alpha)\delta(t),0) + \frac{1}{2}(1+\alpha)\delta^2(t)I_{xx}I_x \quad (37)$$

Subtracting (31) from (37), the error in the Lagrangian motion-magnified sequence, $\varepsilon L$, is $$\varepsilon\_L \approx |\frac{1}{2}(1+\alpha)\delta^2(t)I_{xx}I_x| \quad (38)$$

In the Eulerian approach, the magnified sequence, $\hat{I}E(x, t)$, is computed as $$\tilde{I}_E(x,t) = I(x,t) + \alpha I_t(x,t) = I(x,0) + (1+\alpha)I_t(x,t) \quad (39)$$

similar to Eq. 34, using a two-tap temporal filter to compute It.

Using Taylor expansion of the true motion-magnified sequence, $\hat{I}$ (Eq. 1), about x, gives $$\hat{I}(x,t) \approx I(x,0) + (1+\alpha)\delta(t)I_x + \frac{1}{2}(1+\alpha)^2\delta^2(t)I_{xx} \quad (40)$$

Plugging (34) into (40)

$$\hat{I}(x,t) \approx I(x,0) + (1+\alpha)(I_t - \frac{1}{2}\delta^2(t)I_{xx}I_x) + \frac{1}{2}(1+\alpha)^2\delta^2(t)I_{xx} \approx I(x,0) + (1+\alpha)I_t - \frac{1}{2}(1+\alpha)\delta^2(t)I_{xx}I_x + \frac{1}{2}(1+\alpha)^2\delta^2(t)I_{xx} \quad (41)$$

Subtracting (39) from (41) gives the error in the Eulerian solution $$\varepsilon_E \approx |\frac{1}{2}(1+\alpha)^2\delta^2(t)I_{xx} - \frac{1}{2}(1+\alpha)\delta^2(t)I_{xx}I_x| \quad (42)$$

1.2 With Noise

Let I'(x, t) be the noisy signal, such that $$I'(x,t) = I(x,t) + n(x,t) \quad (43)$$

for additive noise n(x, t).

In the Lagrangian approach, the estimated motion becomes $$\tilde{\delta}(t) = \frac{I'_t}{I'_x} = \frac{I_t + n_t}{I_x + n_x} \quad (44)$$

where nx=∂n/∂x and nt=n(x, t)−n(x, 0).

Using Taylor Expansion on (nt, nx) about (0, 0) (zero noise), and using (34) gives, $$\tilde{\delta}(t) \approx \frac{I_t}{I_x} + n_t\frac{1}{I_x+n_x} + n_x\frac{I_t+n_t}{(I_x+n_x)^2} \approx \delta(t) + \frac{n_t}{I_x} - n_x\frac{I_t}{I_x^2} + \frac{1}{2}\delta^2(t)I_{xx} \quad (45)$$

where the terms involving products of the noise components are ignored.

Plugging into Eq. (32), and using Taylor expansion of I about x+(1+α)δ(t) (t) gives $$\tilde{I}'_L(x,t) \approx I(x+(1+\alpha)\delta(t),0) + (1+\alpha)I_x\left(\frac{n_t}{I_x} - n_x\frac{I_t}{I_x^2} + \frac{1}{2}I_{xx}\delta^2(t)\right) + \quad (46)$$

$$n\bigg)$$

Arranging terms, and substituting (34) in (46), $$\tilde{I}'_L(x,t) \approx I(x+(1+\alpha)\delta(t),0) + (1+\alpha)(n_t - n_x(\delta(t)+\frac{1}{2}\delta^2(t)I_{xx}) + \frac{1}{2}\delta^2(t)I_{xx}I_x) = I(x+(1+\alpha)\delta(t),0) + (1+\alpha)n_t - (1+\alpha)n_x\delta(t) - \frac{1}{2}(1+\alpha)n_x\delta^2(t)I_{xx} + \frac{1}{2}(1+\alpha)\delta^2(t)I_{xx}I_x + n \quad (47)$$

Using (35) again and subtracting (31), the Lagrangian error as function of noise, $\varepsilon L(n)$, is $$\varepsilon_L(n) \approx |(1+\alpha)n_t - (1+\alpha)n_x\delta(t) - \frac{1}{2}(1+\alpha)\delta^2(t)I_{xx}n_z + \frac{1}{2}(1+\alpha)\delta^2(t)I_{xx}I_x + n| \quad (48)$$

In the Eulerian approach, the noisy motion-magnified sequence becomes $$\tilde{I}'_E(x,t) = I'(x,0) + (1-\alpha)I'_t \quad (49)$$
$$= I'(x,0) + (1+\alpha)(I_t + n_t) + n$$
$$= I_E(x,t) + (1+\alpha)n_t + n$$

Using (42) and subtracting (31), the Eulerian error as function of noise, $\varepsilon E(n)$, is $$\varepsilon_E(n) \approx |(1+\alpha)n_t + \frac{1}{2}(1+\alpha)^2\delta^2(t)I_{xx} - \frac{1}{2}(1+\alpha)\delta^2(t)I_{xx}I_x + n| \quad (50)$$

Notice that setting zero noise in (48) and (50), gives the corresponding errors derived for the non-noisy signal in (38) and (42).

Figure 13:
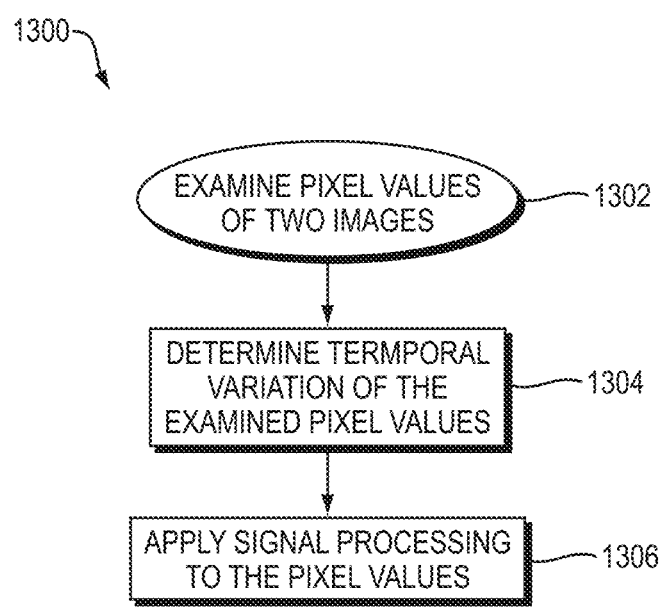
FIG. 13 is a flow diagram illustrating an example embodiment of the Eulerian embodiment of the method described herein.

FIG. 13 is a flow diagram 1300 illustrating an example embodiment of the Eulerian embodiment of the method described herein. The Eulerian-based method begins by examining pixel values of two or more images (1302). The method then determines the temporal variation of the examined pixel values (1304). The method is designed to amplify only small temporal variations. While the method can be applied to large temporal variations, the advantage in the method is provided for small temporal variations. Therefore the method is optimized when the input video has small temporal variations between the images. The method then applies signal processing to the pixel values (1306). For example, signal processing can amplify the determined temporal variations, even when the temporal variations are small.

Figure 14:
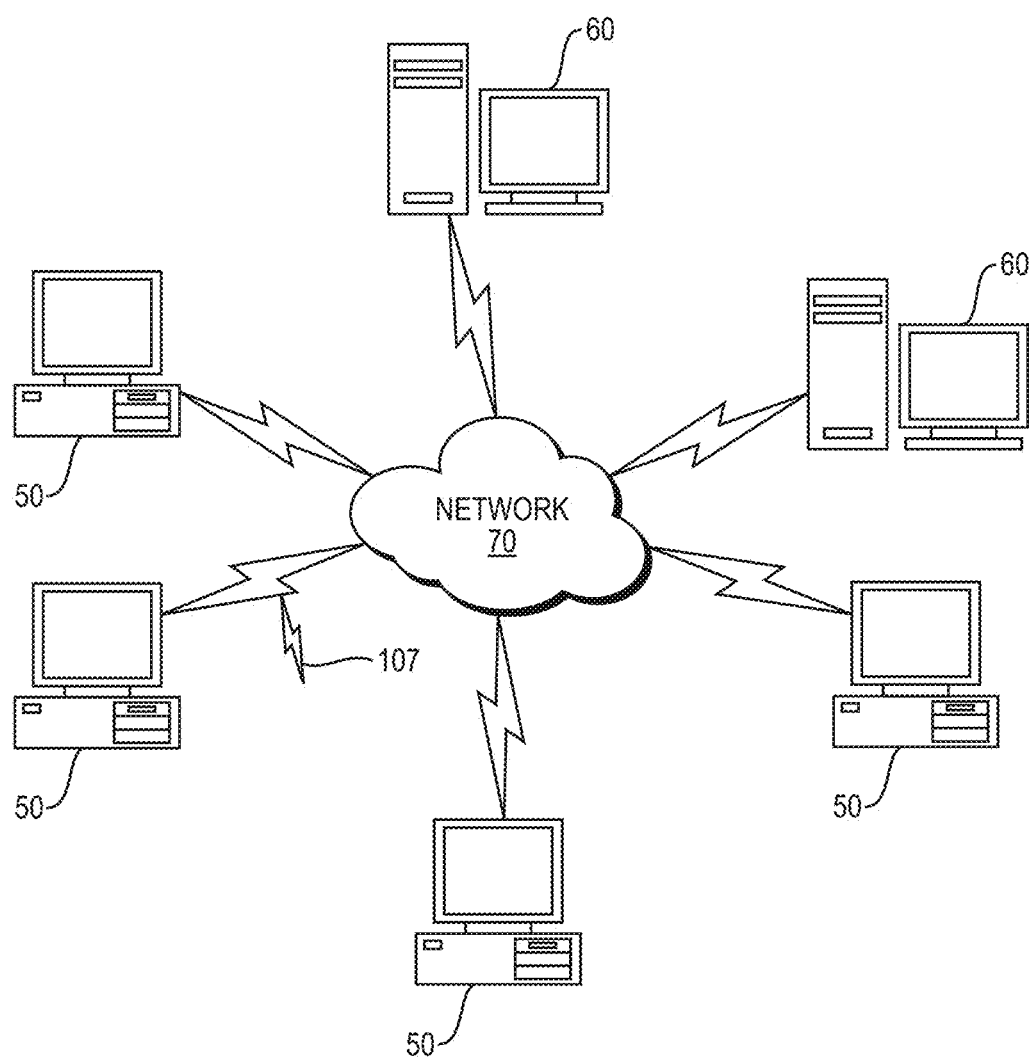
FIG. 14 illustrates a computer network or similar digital processing environment in which the present invention may be implemented.

FIG. 14 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 15:
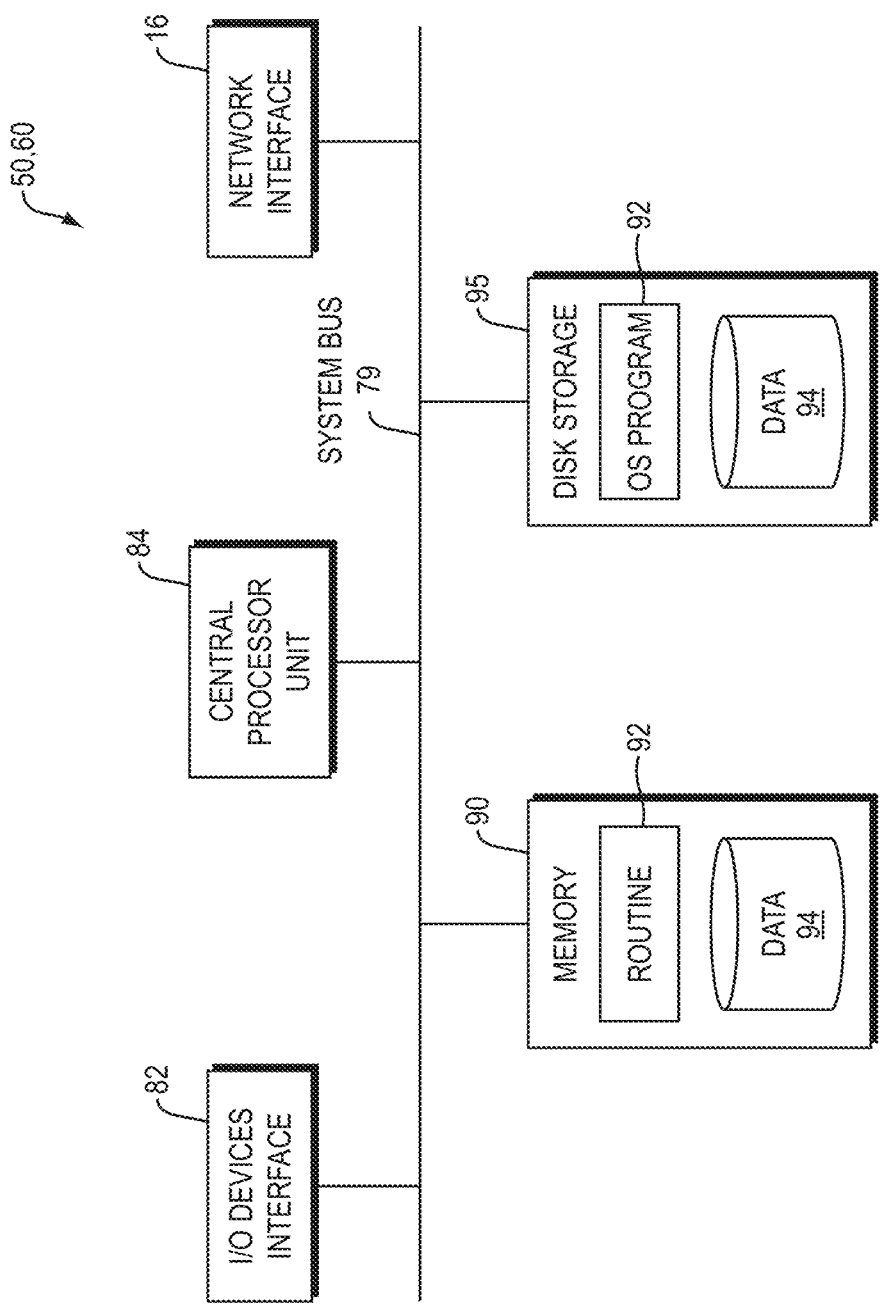
FIG. 15 is a diagram of the internal structure of a computer (e.g., client processor/device or server computers) in the computer system of FIG. 14.

FIG. 15 is a diagram of the internal structure of a computer (e.g., client processor/device 50 or server computers 60) in the computer system of FIG. 14. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 14). Memory 90 provides volatile storage for computer software instructions 92 and data 94 used to implement an embodiment of the present invention (e.g., code detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to example embodiments thereof, it will be understood by those skilled in the art that various changes in form and details may be made therein without departing from the scope of the invention encompassed by the appended claims.

What is claimed is:

1. A method of amplifying temporal variation from at least two images, the method comprising:
converting at least two images to a transform representation in a transform domain;
for each particular spatial position within the at least two images, examining a plurality of coefficient values representing a neighborhood of the spatial position, the neighborhood of the spatial position being spatially the same across each of the at least two images;
calculating a first vector in the transform domain based on the plurality of coefficient values representing the particular spatial position, the first vector representing change from a first image to a second image of the at least two images describing deformation;
modifying the first vector to create a second vector in the transform domain representing amplified movement at the particular spatial position between the first and second images;
calculating a second plurality of coefficients based on the second vector of the transform domain; and
from the second plurality of coefficients, generating an output signal based on motion amplified according to the second vector for each particular spatial position between the first and second images.

2. The method of claim 1, wherein the transform representation is a complex steerable pyramid.

3. The method of claim 1, wherein the first and second pluralities of coefficient values include real and imaginary parts of the coefficients.

4. The method of claim 1, wherein the first vector is a scalar, and wherein modifying the first vector to create the second vector multiplies the scalar by a constant.

5. The method of claim 1, wherein the first vector represents a change in phase from a first image of the at least two images and the second image of the at least two images.

6. The method of claim 1, further comprising temporally bandpassing the second vector resulting in amplifying color variation between images.

7. The method of claim 1 further comprising extracting and visualizing a human pulse signal from the images.

8. A system for amplifying temporal variation from at least two images, the system comprising:
a transform module configured to convert at least two images to a transform representation in a transform domain;
a coefficient examination module configured to, for each particular spatial position within the at least two images, examine plurality of coefficient values representing a neighborhood of the spatial position, the neighborhood of the spatial position being spatially the same across each of the at least two images;
a vector calculation module configured to calculate a first vector in the transform domain based on the plurality of coefficient values representing the particular spatial position, the first vector representing change from a first image to a second image of the at least two images describing deformation;
a vector modification module configured to modify the first vector to create a second vector in the transform domain representing amplified movement at the particular spatial position between the first and second images;
a calculation module configured to calculate a second plurality of coefficients based on the second vector in the transform domain; and
a modified signal generation module configured to generate at least one signal based on the second plurality of coefficients, the generated at least one signal based on amplified motion according to the second vector for each particular spatial position between the first and second images.

9. The system of claim 8, wherein the transform representation is a complex steerable pyramid.

10. The system of claim 8, wherein the first and second pluralities of coefficient values include real and imaginary parts of the coefficients.

11. The system of claim 8, wherein the first vector is a scalar, and wherein the vector modification module is further configured to modify the first vector to create the second vector by multiplying the scalar by a constant.

12. The system of claim 8, further comprising a bandpass module configured to temporally bandpass the second vector resulting in amplifying color variations between images.

13. The system of claim 8, wherein the bandpass module is further configured to extract and visualize human pulse signals from the images.

14. A method of amplifying temporal variation from at least two images, the method comprising:
for each particular pixel of the at least two images, detecting a temporal variation of the particular pixel of the at least two images by applying a bandpass filter, the resulting detected temporal variation of the particular pixel between the two images being below a particular threshold;
amplifying the detected temporal variation of each particular pixel; and
providing an output signal by adding the amplified temporal variation to the at least two images by synthesizing the modulated images, for an amplification factor α, according to $f(x+(1+α) δ(t))$, $δ(t)$ being a displacement function.

15. The method of claim 14, further comprising visualizing a pattern of flow of blood in a body shown in the at least two images.

16. The method of claim 14, wherein applying the bandpass filter includes, for each pixel value, analyzing a one-dimensional (1D) image intensity based on a function $f(x+δ(t))$, where $δ(t)$ is a displacement function.

17. A system for amplifying temporal variation from at least two images, the system comprising:
a pixel examination module configured to, for each particular pixel of the at least two images, detecting a temporal variation of the particular pixel of the at least two images by applying a bandpass filter, the resulting detected temporal variation between the two images being below a particular threshold; and
a signal processing module configured to:
amplify the detected temporal variation of each particular pixel, and
provide an output signal by adding the amplified temporal variation to the at least two images by synthesizing the modulated images for an amplification factor α, according to $f(x+(1+α) δ(t))$, $δ(t)$ being a displacement function.

18. The system of claim 17, further comprising a blood flow visualization module configured to visualize a pattern of flow of blood in a body shown in the at least two images.

19. The system of claim 17, wherein the pixel examination module is further configured to, for each pixel value, analyze a one-dimensional (1D) image intensity profile based on a function $f(x+\delta(t))$, where $\delta(t)$ is a displacement function.

* * * * *